United States Patent
Savart et al.

(10) Patent No.: US 11,571,839 B2
(45) Date of Patent: Feb. 7, 2023

(54) WEB OF IMPREGNATED FIBROUS MATERIAL, PRODUCTION METHOD THEREOF AND USE OF SAME FOR THE PRODUCTION OF THREE-DIMENSIONAL COMPOSITE PARTS

(71) Applicant: Arkema France, Colombes (FR)

(72) Inventors: Thibaut Savart, Lacq (FR); Gilles Hochstetter, Colombes (FR); Anthony Florencie, Bordeaux (FR); Patrice Gaillard, Lacq (FR); Axel Salinier, Lacq (FR); Arthur Pierre Babeau, Lacq (FR)

(73) Assignee: ARKEMA FRANCE, Colombes (FR)

( * ) Notice: Subject to any disclaimer, the term of this patent is extended or adjusted under 35 U.S.C. 154(b) by 121 days.

(21) Appl. No.: 17/040,307

(22) PCT Filed: Mar. 19, 2019

(86) PCT No.: PCT/FR2019/050621
§ 371 (c)(1),
(2) Date: Sep. 22, 2020

(87) PCT Pub. No.: WO2019/180371
PCT Pub. Date: Sep. 26, 2019

(65) Prior Publication Data
US 2021/0086403 A1    Mar. 25, 2021

(30) Foreign Application Priority Data
Mar. 23, 2018 (FR) ..................... 1852552

(51) Int. Cl.
*B29B 15/12* (2006.01)
*B32B 5/26* (2006.01)
(Continued)

(52) U.S. Cl.
CPC .............. *B29B 15/12* (2013.01); *B32B 3/263* (2013.01); *B32B 5/145* (2013.01); *B32B 5/26* (2013.01);
(Continued)

(58) Field of Classification Search
CPC B32B 3/263; B32B 5/145; B32B 5/26; B32B 2260/023; B32B 2260/046;
(Continued)

(56) References Cited

U.S. PATENT DOCUMENTS 5,057,338 A    10/1991    Baucom et al.
5,128,199 A    7/1992    Iyer et al.
(Continued)

FOREIGN PATENT DOCUMENTS

CN    104010783 A    8/2014
EP    0201367 A1    11/1986
(Continued)

OTHER PUBLICATIONS

[NPL-1] EL-Dessouky et al. "Ultra-Light Weight Thermoplastic Composites: Tow-Spreading Technology". ECCM15-15th European Conference on Composite Materials, Enice, Italy, Jun. 24-28, 2012; (pp. 1-8); <http://www.escm.eu.org/eccm15/data/assets/1000.pdf>. (Year: 2012).*
(Continued)

*Primary Examiner* — Frank J Vineis
*Assistant Examiner* — Donald M Flores, Jr.
(74) *Attorney, Agent, or Firm* — Buchanan Ingersoll & Rooney P.C.

(57) ABSTRACT

A web of impregnated fibrous material(s) including N individual tapes of fibrous material(s) stacked and/or joined in relation to one another, in which said N tapes adhere to each other and can overlap at least partially. The tapes of fibrous material(s) include continuous fibers impregnated with at
(Continued)

least one thermoplastic polymer, and optionally a chain extender. The web has a surface, in cross-section perpendicular to the axis of the fibers, S, that is substantially equal to the sum of the surface, in cross-section perpendicular to the axis of the fibers, of each initial individual tape, denoted $S_{th}$, $S_{th}$ being equal to N×l×Ep, wherein l represents the average width of a tape and Ep represents the average thickness of a tape, N being between 2 and 2000, and the average thickness of each individual tape being less than or equal to 150 µm.

44 Claims, 10 Drawing Sheets

(51) Int. Cl.
  *B32B 3/26* (2006.01)
  *B32B 5/14* (2006.01)
  *C08J 5/24* (2006.01)
  *B29K 101/12* (2006.01)
  *B29K 105/08* (2006.01)
  *B29K 507/04* (2006.01)

(52) U.S. Cl.
  CPC .......... *C08J 5/243* (2021.05); *B29K 2101/12* (2013.01); *B29K 2105/0872* (2013.01); *B29K 2507/04* (2013.01); *B32B 2260/023* (2013.01); *B32B 2260/046* (2013.01); *B32B 2262/106* (2013.01); *B32B 2305/076* (2013.01); *C08J 2377/00* (2013.01); *Y10T 428/24967* (2015.01)

(58) Field of Classification Search
  CPC . B32B 2262/106; C08J 5/243; C08J 2377/00; Y10T 428/24967
  See application file for complete search history.

(56) References Cited

U.S. PATENT DOCUMENTS

| | | | |
|---|---|---|---|
| 5,936,861 A | 8/1999 | Jang et al. | |
| 2003/0175520 A1* | 9/2003 | Grutta | B29C 70/46 264/237 |
| 2006/0093802 A1* | 5/2006 | Tsai | B32B 15/00 428/216 |
| 2010/0068518 A1 | 3/2010 | Honma et al. | |
| 2013/0062806 A1 | 3/2013 | Mitadera | |
| 2013/0106014 A1 | 5/2013 | Ishibashi et al. | |
| 2014/0005331 A1* | 1/2014 | Johnson | B29B 15/122 425/114 |
| 2014/0316063 A1 | 10/2014 | Hochstetter et al. | |
| 2014/0363654 A1* | 12/2014 | Roth | C08K 7/14 524/133 |
| 2017/0037186 A1* | 2/2017 | Hochstetter | C08L 77/06 |
| 2017/0106606 A1 | 4/2017 | Toyozumi et al. | |
| 2017/0165875 A1 | 6/2017 | Gaillard et al. | |
| 2017/0183465 A1 | 6/2017 | Kawabe et al. | |
| 2018/0162073 A1 | 6/2018 | Fujiura et al. | |
| 2018/0251601 A1 | 9/2018 | Capelot et al. | |
| 2018/0362760 A1 | 12/2018 | Imai et al. | |

FOREIGN PATENT DOCUMENTS

| | | | | |
|---|---|---|---|---|
| EP | 0287427 A1 | | 10/1988 | |
| EP | 0324680 A2 | | 7/1989 | |
| EP | 0406067 A1 | | 1/1991 | |
| EP | 1505099 A2 | | 2/2005 | |
| EP | 3095901 A1 | * | 11/2016 | ............ D03D 11/00 |
| EP | 3418019 A1 | | 12/2018 | |
| FR | 3039554 A1 | * | 2/2017 | ............... C08J 5/10 |
| JP | 2003181832 A | | 7/2003 | |
| JP | 2008 231237 A | | 10/2008 | |
| JP | 2013 006962 A | | 1/2013 | |
| JP | 2013533137 A | | 8/2013 | |
| JP | 2013-203941 A | | 10/2013 | |
| JP | 2015505879 A | | 2/2015 | |
| JP | 2016011403 A | | 1/2016 | |
| JP | 2016027956 A | | 2/2016 | |
| JP | 2016216654 A | | 12/2016 | |
| JP | 2017507045 A | | 3/2017 | |
| WO | 2011156693 A2 | | 12/2011 | |
| WO | 2012002417 A1 | | 1/2012 | |
| WO | 2012066241 A2 | | 5/2012 | |
| WO | 2012140785 A1 | | 10/2012 | |
| WO | 2013086258 A1 | | 6/2013 | |
| WO | 2015121583 A2 | | 8/2015 | |
| WO | 2016062896 A1 | | 4/2016 | |
| WO | 2015163408 A1 | | 4/2017 | |
| WO | 2018011495 A1 | | 1/2018 | |

OTHER PUBLICATIONS

[NPL-1] Gaillard (FR 3039554 A1), Feb. 3, 2017 (EPO machine translation). (Year: 2017).*
[NPL-2] "Nylon 12"; Wikipedia, Jul. 14, 2022; <https://en.wikipedia.org/wiki/Nylon_12>. (Year: 2022).*
International Search Report (PCT/ISA/210) dated Oct. 21, 2019, by the European Patent Office as the International Searching Authority for International Application No. PCT/FR2019/050621.
Written Opinion (PCT/ISA/237) dated Oct. 21, 2019, by the European Patent Office as the International Searching Authority for International Application No. PCT/FR2019/050621.
International Search Report (with English Translation) and Written Opinion issued in corresponding International Patent Application No. PCT/FR2019/050620, 14 pages (dated Jun. 27, 2019).
Yamashita S. et al., "Volume resistivity of ultra-thin chopped carbon fiber tape reinforced thermoplastics," Composites Part A: Applied Science and Manufacturing, Elsevier, Amsterdam, NL,vol. 90, Aug. 22, 2016 (Aug. 22, 2016), p. 598-605.
Office Action (Notice of Reasons for Refusal) dated Nov. 22, 2021, by the Japanese Patent Office in corresponding Japanese Patent Application No. 2020-550677, and an English Translation of the Office Action. (21 pages).
Office Action (Notice of Reasons for Refusal) dated Nov. 22, 2021, by the Japanese Patent Office in corresponding Japanese Patent Application No. 2020-549763, and an English Translation of the Office Action. (17 pages).
Office Action (Notice of Reasons for Refusal) dated Jul. 5, 2022, by the Japanese Patent Office in corresponding Japanese Patent Application No. 2020-549763, and an English Translation of the Office Action. (10 pages).

* cited by examiner

WEB OF IMPREGNATED FIBROUS MATERIAL, PRODUCTION METHOD THEREOF AND USE OF SAME FOR THE PRODUCTION OF THREE-DIMENSIONAL COMPOSITE PARTS

TECHNICAL FIELD

The present invention relates to a web of impregnated fibrous material comprising N individual tapes of fibrous material(s) in the form of continuous fibers, stacked and/or joined in relation to one another, in which said N tapes can overlap at least partially, and at least one thermoplastic polymer.

The invention also relates to a method for manufacturing the impregnated fibrous material in the form of a web with a reduced manufacturing cost and at a high manufacturing speed.

The invention also relates to the use of the impregnated fibrous material in the form of a web for the manufacture of three-dimensional composite parts.

BACKGROUND AND SUMMARY

The manufacture of fibrous materials impregnated with a thermoplastic polymer or a mixture of thermoplastic polymers, also referred to as thermoplastic resin, may be carried out by passing the fibers continuously through a molten bath of thermoplastic polymer containing an organic solvent such as benzophenone, or in an aqueous dispersion as disclosed in the application EP0324680, by passing the fibers continuously through a fluidized bed, or by spraying the fibers continuously, in particular electrostatically, or also by molten route, in particular by pultrusion as disclosed in the application US 2014/0005331A1. This makes it possible to shape these impregnated fibrous materials in the form of calibrated strips or tapes, which can be used to manufacture composite materials. The impregnated fibrous materials are used in the manufacture of structural parts with a view to lightening them while maintaining a mechanical strength comparable to that obtained for metallic structural parts and/or ensuring the evacuation of electrostatic charges and/or ensuring thermal and/or chemical protection.

Such impregnated fibrous materials are in particular intended for the production of lightweight composite materials for the manufacture of mechanical parts having a three-dimensional structure and possessing properties of good mechanical and thermal strength and capable of evacuating electrostatic charges, i.e., properties compatible with the manufacture of parts in particular in the mechanics, aeronautics and nautics, automobile, energy, construction (buildings), health and medical, sports and leisure, furniture and urban furniture, and electronics fields. Thus, composite materials are used for the production of three-dimensional (3D) parts, it being possible for these composite materials to be produced by a known robot-assisted strip placement method (Automated Fiber Placement (AFP) method for example).

DETAILED DESCRIPTION

Figure 1:
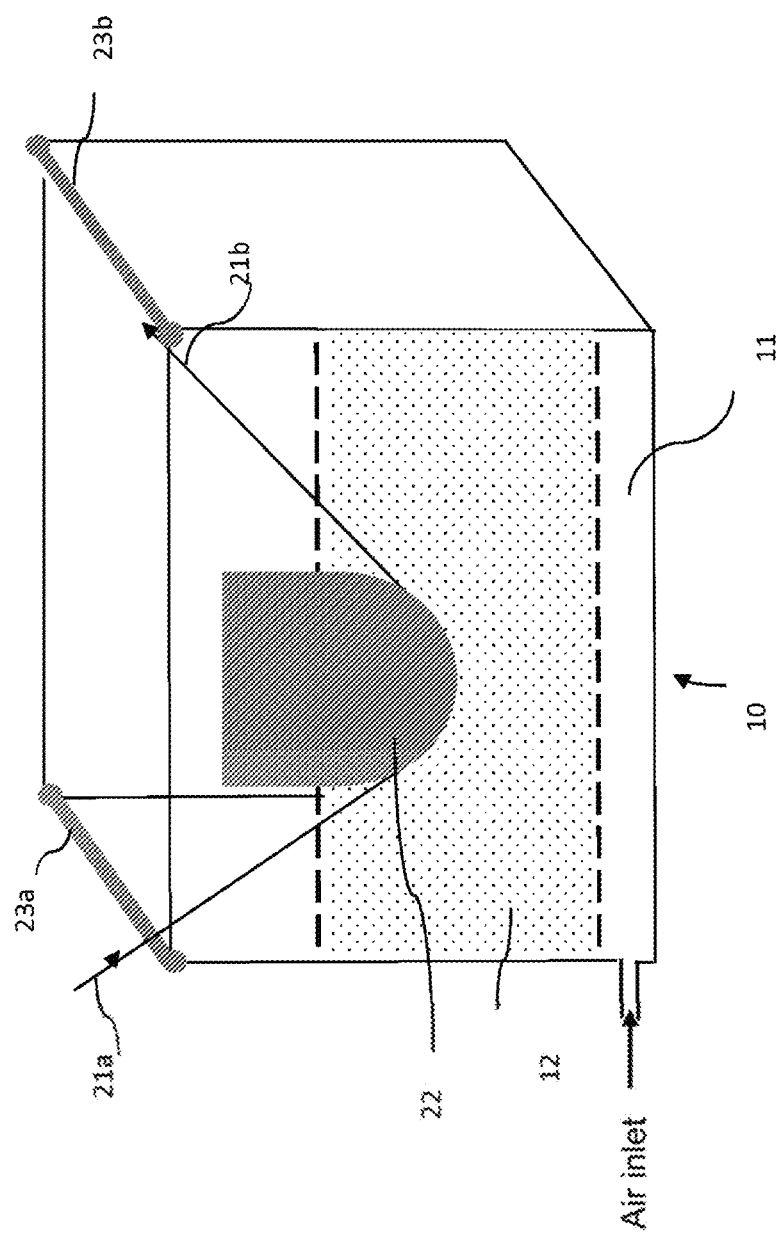
FIG. 1 shows an example of a tank provided with a supporter.

In the present invention, "fibrous material" refers to an assembly of individual reinforcing fibers. After impregnation with the resin, it is presented in the form of an individual tape.

The term "individual tape" refers to a strip, which is a semi-finished product of small thickness, not calibrated in width and in thickness, and made up of a single roving of fibers, or a thin tape made up of one or more fiber rovings, calibrated in thickness and in width.

In all cases, the thickness of the tape is less than or equal to 150 μm, preferably less than or equal to 100 μm.

The said tapes are then stacked and/or joined in relation to one another in the form of webs, which are calibrated in thickness but not necessarily in width.

When it is calibrated in thickness and in width, it is then called calibrated web.

When the geometry of the three-dimensional composite parts is not overly complex, it is advantageous to manufacture the composite parts from the web, in order to be able to increase the productivity of the robot placement (for the shaping) of the semi-products.

The fibers, which may be used in the composition of the fibrous materials, may have different linear grammages or yardage or yarn count or "tex" and/or be in different numbers in the rovings. Also, the most conventionally used rovings are composed of 600 to 4,800 tex for glass fibers and of 3,000 (3K), 6,000 (6K), 12,000 (12K), 24,000 (24K), 48,000 (48K), 50,000 (50K) or 400,000 (400K) fibers for carbon fibers. The carbon fibers generally have a diameter close to 7-8 μm and the glass fibers have a diameter of about 13, 15, 17 or 20 μm, for example.

Since the linear grammage of the fibers is defined beforehand, and consequently the average width of the tapes obtained is also defined, it is not possible to directly obtain a web having any average thickness since this would require rovings having a number of fibers, which does not exist on the market.

It is therefore necessary for individual tapes of defined thickness and whose number of rovings is a multiple of 3K or 6K or 12K or 24K or 48K, or 50K or 400K to be stacked and/or joined in relation to one another in order to obtain webs with various sizes, which do not currently exist on the market.

Therefore, the present invention relates to a web of impregnated fibrous material(s) comprising N individual tapes of fibrous material(s) stacked and/or joined in relation to one another, in which said N individual tapes adhere to each other and can overlap at least partially, wherein said individual tapes of fibrous material(s) comprise continuous fibers impregnated with at least one thermoplastic polymer, and optionally a chain extender, characterized in that said web has a surface, in cross-section perpendicular to the axis of the fibers, S, that is substantially equal to the sum of the surface, in cross-section perpendicular to the axis of the fibers, of each initial individual tape, denoted $S_{th}$; $S_{th}$ being equal to N×l×Ep, wherein l represents the average width of a tape and Ep represents the average thickness of a tape, N being between 2 and 2,000, and the average thickness of each individual tape being less than or equal to 150 μm, preferably less than or equal to 100 μm, in particular between 10 and 100 μm.

In one embodiment, polyaryl sulphides, in particular polyphenylene sulphides (PPS) are excluded from the definition of thermoplastic polymer. The expression "stacked and/or joined" means that said tapes are physically bonded in relation to one another.

The expression "adhering to each other" means that the tapes are bonded or welded or fused or glued to each other, in particular by means of a heating system.

Adhesion is carried out without an external binder or an external compound of the glue type, but only by melting the polymer present in each tape.

The tapes cannot therefore be placed just one above the other or next to each other without adhesion to each other.

The expression "said N individual tapes can overlap at least partially" means that said individual tapes, etc., may not be perfectly joined edge to edge and a tape may therefore overlap the adjacent tape. This may also mean that, for example, two tapes are joined to each other and that a third tape is not 100% stacked on one of the two said tapes and overlaps the two said tapes. In the case where the web is made up of at least 2 layers of tapes, the expression "said N tapes can overlap at least partially" may also mean that an individual tape from one layer overlaps an individual tape from a lower down layer;

In other words, up to 50% of the surface of a tape can overlap at least one other tape.

In particular, up to 40%, preferably up to 30%, more preferably up to 20%, even more preferably up to 10%, in particular up to 5% of the surface of a tape can overlap at least one other tape.

The expression "substantially equal to the sum of the surface, in cross-section perpendicular to the axis of the fibers, of each initial individual tape" means that the cross-section area, perpendicular to the axis of the fibers, S, of said web is equal to the theoretical area $S_{th}+/-25\%$, in particular $S_{th}+/-10\%$, particularly $S_{th}+/-5\%$ and in particular $S_{th}+/-2\%$, preferably $S_{th}-5\%$, even more preferably $S_{th}-10\%$ and $S_{th}-25\%$.

This difference results from the presence of porosity at the interface of the tapes after assembly to form the said web or, on the contrary, from the reduction in the residual porosity of each tape during the assembly operation.

$S_{th}$ therefore corresponds to the theoretical surface in cross-section perpendicular to the axis of the fibers in the web.

Throughout the disclosure, the width of the web corresponds to an average width and the thickness of the web corresponds to an average thickness, i.e., an average width and thickness over the entire length of the web. This means that the width and thickness can vary along the web.

Advantageously, in the absence of reheating, the impregnated fibrous material web is non-flexible.

This means that the web is not capable of assuming a complex shape at ambient temperature and that it can do so only beyond the Tg of the resin and preferably beyond the Tm of the resin, when the resin is semi-crystalline of the Tm of the resin. In other words, the web does not have drapability.

In one embodiment, said individual tape is thin and consists of a strip, the average thickness being less than or equal to 100 μm, in particular between 10 and 100 μm.

The way to verify that the average thickness is less than or equal to 100 μm is making measurements on statistically representative samples of the strip by non-destructive measuring means.

Throughout the disclosure, the width of the strip corresponds to an average width and the thickness of the strip corresponds to an average thickness, i.e., an average width and thickness over the entire length of the strip. This means that the width and thickness may vary along the strip but that on average the thickness is less than or equal to 100 μm. The way to verify that the average thickness is less than 100 μm over the entire length of the strip is making measurements on statistically representative samples of the strip by non-destructive measuring means.

The expression "strip of uncalibrated width" means that the width of the strip is not constant, the width possibly being equal to l+/−20%, particularly l+/−15%, in particular l+/−10% where l represents the average width.

The expression "strip of uncalibrated thickness" means that the thickness of the strip is not constant over its entire length, it being possible for the thickness to be equal to e+/−20%, particularly e+/−15%, in particular e+/−10% where e represents the average thickness.

Advantageously, the expressions "uncalibrated width" and "uncalibrated thickness" respectively mean that the width is equal to l+/−20% of the average width and the thickness is equal to e+/−20% of the average thickness.

Advantageously, the expressions "uncalibrated width" and "uncalibrated thickness" respectively mean that the width is equal to l+/−20% of the average width and the thickness is equal to e+/−15% of the average thickness.

Advantageously, the expressions "uncalibrated width" and "uncalibrated thickness" respectively mean that the width is equal to l+/−20% of the average width and the thickness is equal to e+/−10% of the average thickness.

Advantageously, the expressions "uncalibrated width" and "uncalibrated thickness" respectively mean that the width is equal to l+/−15% of the average width and the thickness is equal to e+/−20% of the average thickness.

Advantageously, the expressions "uncalibrated width" and "uncalibrated thickness" respectively mean that the width is equal to l+/−10% of the average width and the thickness is equal to e+/−20% of the average thickness.

Advantageously, the expressions "uncalibrated width" and "uncalibrated thickness" respectively mean that the width is equal to l+/−15% of the average width and the thickness is equal to e+/−15% of the average thickness.

Advantageously, the expressions "uncalibrated width" and "uncalibrated thickness" respectively mean that the width is equal to l+/−10% of the average width and the thickness is equal to e+/−15% of the average thickness.

Advantageously, the expressions "uncalibrated width" and "uncalibrated thickness" respectively mean that the width is equal to l+/−15% of the average width and the thickness is equal to e+/−10% of the average thickness.

Advantageously, the expressions "uncalibrated width" and "uncalibrated thickness" respectively mean that the width is equal to l+/−10% of the average width and the thickness is equal to e+/−10% of the average thickness.

In another embodiment, said individual tape consists of a "thin tape", the average thickness being less than or equal to 100 μm, in particular between 10 and 100 μm.

The way to verify that the average thickness is less than or equal to 100 μm is making measurements on statistically representative samples of the thin tape by non-destructive measuring means.

Throughout the disclosure, the thickness of the thin tape corresponds to an average thickness, i.e., an average thickness over the entire length of the thin tape. This means that the thickness may vary along the thin tape but that on average the thickness is less than or equal to 100 μm. The way to verify that the average thickness is less than 100 μm over the entire length of the thin tape is making measurements on statistically representative samples of the thin tape by non-destructive measuring means.

The width of the thin tape is calibrated and therefore constant over the entire length of the thin tape.

In the case of the web, the thickness corresponds to the average thickness, i.e., an average thickness over the entire length of the web. This means that the thickness can vary along the web.

In the case of webs, the width corresponds to the average width over the entire length of the web.

In the case of calibrated webs, the width of the web is constant over the entire length of the web.

The expression "calibrated width" means that the width of the thin tape or of the calibrated web is constant over its entire length, wherein the width can be equal to l+/−5%, in particular l+/−2% where l represents the average width.

The expression "calibrated thickness" means that the thickness of the thin tape or of the web, calibrated or not, is constant over its entire length, and the thickness can be equal to e+/−5%, in particular the thickness being equal to e+/−2% where e represents the average thickness.

Advantageously, the expressions "calibrated width" and "calibrated thickness" respectively mean that the width is equal to l+/−5% of the average width and the thickness is equal to e+/−5% of the average thickness.

Advantageously, the expressions "calibrated width" and "calibrated thickness" respectively mean that the width is equal to l+/−5% of the average width and the thickness is equal to e+/−2%.

Advantageously, the expressions "calibrated width" and "calibrated thickness" respectively mean that the width is equal to l+/−2% of the average width and the thickness is equal to e+/−5% of the average thickness.

Advantageously, the expressions "calibrated width" and "calibrated thickness" respectively mean that the width is equal to l+/−2% of the average width and the thickness is equal to e+/−2% of the average thickness.

The expression "substantially equal" means that the surface, S, in cross-section perpendicular to the axis of the fibers of said web is equal to the sum of the cross-section surface of each initial individual tape, $S_{th}$+/−25%, in particular $S_{th}$+/−10%, particularly $S_{th}$+/−5% and in particular $S_{th}$+/−2%, preferably $S_{th}$−5%, even more preferably $S_{th}$−10% and $S_{th}$−25%.

N is comprised from 2 to 2,000 means that at a minimum:
either two individual tapes are joined together to form a web having an average thickness of one individual tape and an average width substantially equal to the average width of two individual tapes,
either two individual tapes are stacked to form a web having an average thickness substantially equal to the thickness of two individual tapes and an average width substantially equal to the average width of one individual tape,
either the two individual tapes are partially stacked to form a web having an average thickness which varies substantially between the average thickness of an individual tape and the average thickness of two individual tapes and an average width substantially between the average width of an individual tape and the average width of two joined individual tapes.

Apart from two tapes, three configurations exist:
either the individual tapes are joined together to form a strip having an average thickness of one individual tape and an average width substantially equal to the average width of the individual tapes,
either the individual tapes are stacked to form a strip having an average thickness substantially equal to the average thickness of the individual tapes and an average width substantially equal to the average width of one individual tape,
either a part of the individual tapes are joined and another part of the individual tapes are stacked, the total number of tapes from both parts being equal to N.

The expression "substantially equal" has the same meaning as above.

When more than two tapes (N tapes) are joined and stacked, the average thickness of the web may be constant over the entire width of the web, but it may also be variable over the width of said web depending on the calender finally used to give the shape, and the total number of stacked and joined tapes is equal to N between 2 and 2,000.

The web may have an average width greater than or less than or equal to the sum of the average widths of the N individual tapes joined and an average thickness greater than or less than or equal to the sum of the average thicknesses of the N individual tapes stacked because both the joining and the stacking may either reduce the porosity, if any, of each tape or create porosity between the joined or stacked tapes.

This is why the real surface, S, in cross-section perpendicular to the axis of the fibers of said web is equal to the sum of the surface in cross-section perpendicular to the axis of the fibers of each initial individual tape, $S_{th}$+/−25%, in particular $S_{th}$+/−10%, particularly $S_{th}$+/−5% and in particular $S_{th}$+/−2%, preferably $S_{th}$−5%, even more preferably $S_{th}$−10% and $S_{th}$−25%, In one embodiment, the porosity level of each impregnated individual tape is less than 10%, particularly less than 5%, in particular less than 2%.

In another embodiment, the porosity level of said web of impregnated fibrous material is less than 10%, particularly less than 5%, in particular less than 2%.

In yet another embodiment, the porosity level of each impregnated individual tape is less than 10%, particularly less than 5%, in particular less than 2% and the porosity level of said web of impregnated fibrous material is less than 10%, particularly less than 5%, in particular less than 2%.

Advantageously, the porosity level of said initial tape has a porosity of between 5 and 10% and the porosity level of said web is less than 5%.

Advantageously, the porosity level of said initial tape has a porosity of between 2 and 5% and the porosity level of said web is less than 2%.

In these last two embodiments, the appearance of said web is therefore improved compared with the initial appearance of the individual tapes.

Said web of fibrous material comprises Nl tapes in its width and Nep tapes in its thickness, $N=\Sigma_{i=1}^{Nl}\Sigma_{j=1}^{Nep}N_{ij}$, each individual tape comprising a number of fibers, in particular carbon fibers, selected from a multiple of 3,000 or 50,000 fibers.

Advantageously, each individual tape comprises a number of carbon fibers selected from m×12K fibers, n×24K fibers, p×48K, q×50K fibers and w×400K, m being between 1 and 40, in particular 1 to 4, n being between 1 and 20, q being between 1 and 10, p being between 1 and 10, in particular 1, and w is equal to 1.

The thickness of the web may be constant over the entire width of the web, i.e., in the case of an assembly of tapes all having the same thickness, the number of tapes Nep in the thickness is the same at any point of the web.

Conversely, the thickness of the web can be variable in particular in accordance with the width of said web, i.e., in the case of tapes all having the same thickness, the number of tapes Nep in the thickness is different according to the position considered in the width of said web.

In any case, the total number of tapes N is between 2 and 2,000.

Said N tapes of said web of impregnated fibrous material as defined above consist of identical or different fibrous materials, in particular identical.

There may therefore be, for example, at least one of the tapes consisting of carbon fiber fibrous material and at least one of the tapes consisting of glass fiber fibrous material.

It would not depart from the scope of the invention if at least one of the tapes were made by a mixture of fibrous materials, for example, glass fiber and carbon fiber.

Advantageously, said N tapes in said web of impregnated fibrous material as defined above consist of identical fibrous materials.

Nor would it depart from the scope of the invention if the yard counts of fibers of the same nature or of different nature were identical or different, within the assembly of N tapes, both in the thickness (stacking of Nep tapes) and in the width (juxtaposition or joining of Nl tapes).

It is therefore possible to have, for example, a tape based on 50K carbon fibers joined to and/or stacked on a tape based on 24K carbon fibers.

However, it is also possible to have a tape based on 50K carbon fibers joined to and/or stacked on a tape based on glass fibers with a grammage equal to 2,400 Tex.

In one embodiment, the N tapes have identical individual average thickness and average width, the average thickness of the web $\bar{e}$ being equal to $\overline{Nep}\times er$, $\overline{Nep}$ being the average number of tapes in the thickness, er being the average thickness of an individual tape, and the average width of the web $\bar{l}$ being equal to $\overline{Nl}\times lr$, $\overline{Nl}$ being the average number of tapes in the width and lr being the average width of an individual tape.

In this embodiment, the web surface, S, in cross-section perpendicular to the axis of the fibers is equal to the web theoretical surface, Sth, in cross-section perpendicular to the axis of the fibers: therefore, the porosity level between the average calculated on the N tapes before assembly and on the final web resulting from assembly is maintained; where the porosities may, for example, have changed their position, i.e., from "internal" porosities in each tape (i.e., in the core of each tape) to "external" porosities resulting from the creation of porosity during assembly, all at overall isoporosity, other possible case being that the "internal" porosity in each tape has not changed during assembly of the tape and the "external" porosity after assembly is negligible.

In another embodiment, the average thickness and the average width of the N individual tapes is identical, the average thickness of the web $\bar{e}$ being less than $\overline{Nep}\times er$, $\overline{Nep}$ being the average number of tapes in the thickness, er being the average thickness of an individual tape, and the average width of the web $\bar{l}$ being less than $\overline{Nl}\times lr$, $\overline{Nl}$ being the average number of tapes in the width and lr being the average width of an individual tape.

In this embodiment, there is a decrease in the porosity of the individual tapes after assembly and the web may have a constant average thickness over its entire width or may have a different thickness depending on the position considered in the width of the web.

In yet another embodiment, the average thickness and average width of the N individual tapes is identical, the average thickness of the web $\bar{e}$ is greater than $\overline{Nep}\times er$, $\overline{Nep}$ being the average number of tapes in the thickness, er being the average thickness of an individual tape, and the average width of the web $\bar{l}$ being greater than $\overline{Nl}\times lr$, $\overline{Nl}$ being the average number of tapes in the width and lr being the average width of an individual tape.

In this embodiment, porosity is created between the tapes after assembly and the web may have a constant average thickness over its entire width or may have a different thickness depending on the position considered in the width of the web.

In this embodiment, there may also be maintenance of overall porosity levels, but there may be displacement of these porosities during the assembly of tapes, from the inside of the tapes to the outside towards the interfaces between tapes.

In other words, if there are N tapes with porosity P/N within them, the overall porosity is then equal to P.

If these tapes are assembled by stacking them in width and thickness, the porosity within each tape can be reduced and then being P'/N=P/N−ε/N, where ε/N is the decrease in porosity within each tape is a consequence of the tape assembly method. However, in parallel, a porosity between the assembled tapes may appear, which is also a consequence of the tape assembly method, this porosity then being P'''/N.

If the total decrease in porosity within the tapes ε is equal to P''' created between the rovings, the overall porosity level is then maintained.

According to a first embodiment of the web of fibrous material, the N tapes of the web of impregnated fibrous material, defined above, are stacked, the number of tapes in the width Nl being equal to 1 and the number of tapes in the thickness Nep being between 2 and 2,000.

In this embodiment, there is therefore only one tape width and from 2 to 2000 tapes in thickness.

According to a second form of the web of fibrous material, the N tapes in the web of impregnated fibrous material, defined above, are joined together, the number of tapes in the thickness Nep being equal to 1 and the number of tapes in the width Nl being between 2 and 2,000.

In this embodiment, there is therefore only one tape thickness and from 2 to 2,000 tapes in width.

According to a third form of the web of fibrous material, the N tapes in the web of impregnated fibrous material, defined above, are stacked and joined together.

In this case, all the scenarios are possible with a thickness of the web that is constant over its entire width or a thickness that differs depending on the point considered in its width.

In yet another embodiment, the average thickness and/or width of the N individual tapes is different, the average thickness of the web being equal to $\overline{Nep} \times$ the average thickness of each individual tape and the average width of the web being equal to $\overline{Nl} \times$ the average width of each individual tape.

In a first alternative, the thickness of said web of impregnated fibrous material defined above, consisting of said N stacked and/or joined tapes, is variable over its width.

In this alternative, either there are the same number of stacked tapes in the thickness, whatever the position along the width of the web, and the variations in the thickness of the web depending on its width come directly from the variations in thickness from one tape to the other, or in addition, there are not the same number of stacked tapes in the thickness of the web, depending on the point considered in its width, and the variation in the number of stacked tapes does not compensate for the variations in thickness from one tape to the other. This makes it possible to give particular geometrical shapes to the web, in accordance with its width.

In a second alternative, the thickness of said web of impregnated fibrous material defined above, consisting of said N stacked and/or joined tapes, is constant over its entire width.

In this latter alternative, the same number of stacked tapes in thickness makes it possible to compensate for variations in thickness from one tape to another.

The fiber content by volume of the various webs defined above is constant in at least 70% of the volume of each N tapes of fibrous material stacked and/or joined in said web, said N tapes being capable of overlapping at least partially, in particular in at least 80% of the volume of each N tapes of fibrous material stacked and/or joined in said web, said N tapes being capable of overlapping at least partially, in particular in at least 90% of the volume of each N tapes of fibrous material stacked and/or joined in said web, said N tapes being capable of overlapping at least partially, more particularly in at least 95% of the volume of each N tapes of fibrous material stacked and/or joined in said web, said N tapes being capable of overlapping at least partially.

The fiber content ranges from 45 to 65% by volume, preferably from 50 to 60% by volume, in particular from 54 to 60% for each N tapes of fibrous material stacked and/or joined of said web, said N tapes being capable of overlapping at least partially, in said web of fibrous material.

Advantageously, the fiber content by volume of the various webs defined above is constant in at least 70% of the volume of each N tapes of fibrous material stacked and/or joined of said web, said N tapes being capable of overlapping at least partially, in particular in at least 80% of the volume of each N tapes of fibrous material stacked and/or joined in said web, said N tapes being capable of overlapping at least partially, in particular in at least 90% of the volume of each N tapes of fibrous material stacked and/or joined in said web, said N tapes being capable of overlapping at least partially, more particularly in at least 95% of the volume of each N tapes of fibrous material stacked and/or joined in said web, said N tapes being capable of overlapping at least partially, and the fiber content is between 45 and 65% by volume, preferably between 50 and 60% by volume, particularly between 54 and 60% for each N tapes of fibrous material stacked and/or joined in said web, said N tapes being capable of overlapping at least partially in said web of fibrous material.

Advantageously, said N tape(s) of fibrous material of the web of fibrous material defined above consist of the same at least one thermoplastic polymer.

This means that each tape consists of the same polymer, but that the polymer of each tape may be a mixture of polymers, for example, PEKK and PEI.

In another embodiment, said at least one thermoplastic polymer of said N tape(s) of fibrous material assembled and/or joined may be different provided that the polymers constituting the stacked and/or joined tapes, said N tapes being capable of at least partially overlapping, are compatible or partially miscible.

In one embodiment, said web of fibrous material defined above consists of Nep tapes stacked and Nl tapes joined, the number of tapes in the thickness Nep being between 1 and 4 and the number of tapes in the width Nl being between 1 and 94.

Advantageously, the number of stacked tapes in the thickness Nep is the same for all the Nl tapes and the average thickness is constant over the entire width of said web.

In one embodiment, the number of tapes in the thickness Nep is selected from 2 and 4 and the number of tapes in the width Nl=1.

Said web therefore consists of a single width and two or four tapes of thickness.

In another embodiment, the number of tapes in the thickness Nep=1 and the number of tapes in the width Nl is selected from 24 and 32.

Said web therefore consists of a single thickness over the entire width of the 24 or 32 tapes.

In yet another embodiment, the number of tapes in the thickness Nep=2 and the number of tapes in the width Nl is selected from 46, 62 and 92.

Advantageously, said web of fibrous material as defined above has a cross-sectional surface dimension represented by, respectively, an average width and an average thickness selected from: 300 mm×2 mm; 200 mm×2 mm, 150 mm×2 mm; 100 mm×2 mm; 596.9×1 mm; 393.7 mm×1 mm; 292 mm×1 mm; 200 mm×1 mm; 150 mm×1 mm; 100 mm×1 mm; 15 mm×0.25 mm, 15 mm×0.225 mm, 14 mm×0.265 mm, 14 mm×0.240 mm, 12.7 mm×0.265 mm, 12.7 mm×0.189 mm, 596.9 mm×0.12 mm; 393.7 mm×0.12 mm; 292.1 mm×0.12 mm.

According to another aspect, the present invention relates to the use of a web of impregnated fibrous material, such as defined above, for the manufacture of three-dimensional composite parts by automatic placement of said webs by means of a robot.

All the characteristics defined for the web are valid for said use of the web.

Advantageously, said manufacturing of said composite parts relates to the fields of transportation, in particular automotive, oil and gas, in particular offshore, gas storage, aeronautics, naval, railways; renewable energies, in particular wind energy, hydro turbines, energy storage devices, solar panels; thermal protection panels; sports and leisure, health and medical and electronics.

According to another aspect, the present invention relates to a three-dimensional composite part, characterized in that it results from the use of at least one web of impregnated fibrous material as defined above.

All the characteristics defined for the web are valid for said composite part.

According to yet another aspect, the present invention relates to a method for preparing a web of fibrous material as defined above, characterized in that it comprises a step of stacking and/or joining said tapes of fibrous material as defined above, said N tapes being capable of overlapping at least partially.

All the characteristics defined for the web are valid for said preparation method.

Advantageously, the stacking and/or joining step is carried out by at least one of the following systems:
1) heating said tape by at least one heating system and then passing said tape over at least one supporter provided with a heating system and then passing it over a non-heating calender,
2) passing said tape over at least one supporter provided with a heating system and then passing it over a heating calender,
3) heating said tape by at least one heating system and then passing it over a heating calender,
4) heating said tape by at least one heating system and then passing it through a hot drawing plate and passing it over a heating calender.

Advantageously, said at least one heating system is selected from an infrared lamp, a UV lamp, convection heating, microwave heating, laser heating and High Frequency (HF) heating.

In one embodiment, the method defined above is characterized in that it further comprises a prior step of heating a fibrous material pre-impregnated with thermoplastic polymer and optionally a chain extender, and of finalizing the impregnation to obtain an impregnated fibrous material consisting of a tape in the form of a strip having an average thickness of less than or equal to 100 µm, in particular between 10 µm and 100 µm, and optionally a step of shaping and calibrating the roving or said parallel rovings of said impregnated fibrous material to obtain an impregnated fibrous material consisting of a tape in the form of a thin tape having an average thickness of less than or equal to 100 µm, in particular between 10 µm and 100 µm.

In another embodiment, the method defined above is characterized in that it further comprises a prior step of pre-impregnating a fibrous material, particularly by powder deposition, by molten route, particularly by pultrusion, by cross-head extrusion of molten thermoplastic polymer and, optionally, a chain extender, by continuous passage of the fibers in an aqueous thermoplastic polymer powder dispersion and, optionally, a chain extender, or aqueous thermoplastic polymer particle dispersion and, optionally, a chain extender, or aqueous thermoplastic polymer emulsion or suspension, by fluidized bed, equipped or not with at least one supporter (E'), by spraying by nozzle or spray gun by dry route in a tank equipped or not equipped with at least one supporter (E') in order to obtain a pre-impregnated fibrous material.

In yet another embodiment, the method defined above is characterized in that it further comprises a step of shaping the web by means of at least one notched calender, possibly a heating calender.

Advantageously, the method defined above is characterized in that it comprises the following steps:
i) Pre-impregnating a fibrous material particularly by powder deposition, by molten route, in particular by pultrusion, by cross-head extrusion of molten polymer, by continuous passage of the fibers in an aqueous polymer powder dispersion or aqueous polymer particle dispersion or aqueous polymer emulsion or suspension, by fluidized bed, equipped or not with at least one supporter (E'), by spraying by nozzle or spray gun by dry route in a tank equipped or not equipped with at least one supporter (E') in order to obtain a pre-impregnated fibrous material,
ii) the step of heating said pre-impregnated fibrous material and finalizing the impregnation to obtain an impregnated fibrous material consisting of a tape in the form of a strip having an average thickness of less than or equal to 100 µm, in particular between 10 µm and 100 µm,
iii) optionally the step of shaping and calibrating the roving or said parallel rovings of said impregnated fibrous material to obtain an impregnated fibrous material consisting of a tape in the form of a thin tape having an average thickness of less than or equal to 100 µm, in particular between 10 µm and 100 µm.
iv) stacking and/or joining N tapes of fibrous material, said N tapes being capable of overlapping at least partially, by at least one of the following systems:
1) heating said tape by at least one heating system and then passing said tape over at least one supporter provided with a heating system and then passing it over a heating calender,
2) passing said tape over at least one supporter provided with a heating system and then passing it over a heating calender,
3) heating said tape by at least one heating system and then passing it over a heating calender,
4) heating said tape by at least one heating system and then passing it through a hot drawing plate and passing it over a heating calender.
v) shaping the web by means of at least one notched calender, optionally a heating calender.

Advantageously, the method as defined above is characterized in that it is carried out at a speed of at least 10 m/min, in particular of at least 20 m/min, preferably of at least 30 m/min.

Since the impregnation and shaping and calibration steps are independent of the method for preparing the web, their speed of production has no consequence on the method of the present invention and are therefore not limiting for productivity.

Steps (i), (ii), and (iii) are disclosed in more detail below in the section "Method for the preparation of tapes, in particular in the form of strip and thin tape".

Step iv) is disclosed in more detail in the section "Method for the preparation of tapes in the form of a web"

Polymer Matrix

Thermoplastic, or thermoplastic polymer, refers to a material that is generally solid at ambient temperature, which may be semi-crystalline or amorphous, and that softens during a temperature increase, in particular after passage by its glass transition temperature (Tg) and flows at a higher temperature when it is amorphous, or that may exhibit a sharp transition upon passing its so-called melting temperature (Tm) when it is semi-crystalline, and become solid again when the temperature decreases below its crystallization temperature (for semi-crystalline) and below its glass transition temperature (for an amorphous).

The Tg and Tm are determined by differential scanning calorimetry (DSC) according to standard 11357-2:2013 and 11357-3:2013, respectively.

As for the polymer constituting the impregnation matrix for the fibrous material, it is advantageously a thermoplastic polymer or a mixture of thermoplastic polymers. This polymer or mixture of thermoplastic polymers can be ground in powder form, so that it can be used in a device such as a tank, in particular in a fluidized bed or aqueous dispersion.

The device in tank form, in particular in a fluidized bed, can be open or closed.

In one embodiment, polyaryl sulfides, in particular polyphenylene sulfides (PPS) are excluded from the definition of polymer constituting the impregnation matrix of the fibrous materials.

Optionally, the thermoplastic polymer or blend of thermoplastic polymers further comprises carbon-based fillers, in particular carbon black or carbon-based nanofillers, preferably selected from among graphenes, carbon nanotubes, carbon nanofibrils or their blends. These fillers make it possible to conduct electricity and heat, and therefore to facilitate the melting of the polymer matrix when it is heated.

Optionally, said thermoplastic polymer comprises at least one additive, in particular selected from among a catalyst, an antioxidant, a heat stabilizer, a UV stabilizer, a light stabilizer, a lubricant, a filler, a plasticizer, a flame retardant, a nucleating agent, a chain extender and a dye, an electrical conductor, a heat conductor or a mixture thereof.

Advantageously, said additive is selected from among a flame retardant, an electrical conductor and a heat conductor.

According to another variant, the thermoplastic polymer or mixture of thermoplastic polymers can further comprise liquid crystal polymers or cyclized polybutylene terephthalate, or mixtures containing the latter, such as the CBT100 resin marketed by the company CYCLICS CORPORATION. These compounds in particular make it possible to fluidify the polymer matrix in molten state, for better penetration to the core of the fibers. Depending on the nature of the polymer, or mixture of thermoplastic polymers, used to make the pre-impregnation matrix, in particular its melting temperature, one or the other of these compounds will be selected.

The thermoplastic polymers going into the makeup of the impregnation matrix of the fibrous material can be selected from:

the polymers and copolymers from the family of aliphatic, cycloaliphatic or semi-aromatic polyamides (PA) (also called polyphthalamides (PPA)), polyureas, in particular aromatic polyureas, polymers and copolymers from the family of acrylics such as polyacrylates, and more particularly polymethyl methacrylate (PMMA) or derivatives thereof, polymers and copolymers from the family of poly(aryletherketones) (PAEK) such as polyether ether ketone (PEEK), or poly(aryletherketonesketones) (PAEKK) such as poly(etherketoneketone) (PEKK) or derivatives thereof, aromatic polyether-imides (PEI), polyarylsulfides, in particular polyphenyl sulfides (PPS), polyarylsulfides, in particular polyphenylene sulfones (PPSU), polyolefins, in particular polypropylene (PP);

polylactic acid (PLA), polyvinyl alcohol (PVA), fluorinated polymers, in particular polyvinylidene fluoride (PVDF), polytetrafluoroethylene (PTFE) or polychlorotrifluoroethylene (PCTFE), and mixtures thereof.

In one embodiment, the thermoplastic polymers going into the makeup of the impregnation matrix of the fibrous material can be selected from:

the polymers and copolymers from the family of aliphatic, cycloaliphatic or semi-aromatic polyamides (PA) (also called polyphthalamides (PPA)), polyureas, in particular aromatic polyureas, polymers and copolymers from the family of acrylics such as polyacrylates, and more particularly polymethyl methacrylate (PMMA) or derivatives thereof, polymers and copolymers from the family of poly(aryletherketones) (PAEK) such as polyether ether ketone (PEEK), or poly(aryletherketonesketones) (PAEKK) such as poly(etherketoneketone) (PEKK) or derivatives thereof, aromatic polyether-imides (PEI), polyarylsulfides, in particular polyphenylene sulfones (PPSU), polyolefins, in particular polypropylene (PP);

polylactic acid (PLA), polyvinyl alcohol (PVA), fluorinated polymers, in particular polyvinylidene fluoride (PVDF), polytetrafluoroethylene (PTFE) or polychlorotrifluoroethylene (PCTFE), and mixtures thereof.

Advantageously, when said polymer is a mixture of two polymers P1 and P2, the proportion by weight of polymer P1 and P2 is between 1-99% and 99-1%.

Advantageously, when said thermoplastic polymer is a mixture, and when the preimpregnation method uses a dry powder, this mixture comes in the form of a powder resulting either from dry blending before introduction into the preimpregnation tank or by dry blending directly in the tank or even by milling of a compound made in advance in an extruder.

Advantageously, this mixture consists of a powder obtained by dry blend, before introduction into the tank or directly in the tank, and this mixture of two polymers P1 and P2 is a mixture of PEKK and PEI.

Advantageously, the PEKK/PEI mixture is from 90-10% to 60-40% by weight, in particular from 90-10% to 70-30% by weight.

The thermoplastic polymer can correspond to the final non-reactive polymer that will impregnate the fibrous material or to a reactive pre-polymer, which will also impregnate the fibrous material, but which may react with itself or with another pre-polymer, depending on the chain end carried by said pre-polymer, after pre-impregnation, or with a chain extender and in particular during heating at a heating calendar in order to lead to said final non-reactive polymer, or also to a partially polymerized reactive thermoplastic pre-polymer, optionally with said chain extender, and having a number average molecular mass (Mn) ranging from 500 to 10,000, preferably from 4,000 to 8,000. Said partially polymerized reactive thermoplastic pre-polymer is capable of leading to said non-reactive final polymer by heating depending on the Tg and/or Tm of the polymer used.

The expression "non-reactive polymer" means that the molecular weight is no longer likely to change significantly, i.e. that its number-average molecular weight (Mn) changes by less than 50% when it is used and therefore corresponds to the final polyamide polymer of the thermoplastic matrix.

On the contrary, the expression "reactive polymer" means that the molecular weight of said reactive polymer will change during its implementation because of the reaction of reactive prepolymers together by condensation, substitution or with a chain extender by polyaddition and without the elimination of volatile by-products to lead to the final (non-reactive) polyamide polymer of the thermoplastic matrix.

According to a first possibility, said pre-polymer can comprise or be constituted of at least one carrier reactive pre-polymer (polyamide) on the same chain (that is to say, on the same pre-polymer), with two terminal functions X' and Y' that are respectively co-reactive functions relative to one another by condensation, more specifically with X' and Y' being amine and carboxy or carboxy and amine, respectively.

In this first possibility, said at least one reactive thermoplastic pre-polymer may be partially polymerized, optionally with said chain extender, and has a number-average molecular weight (Mn) ranging from 500 to 10,000, preferably from 4,000 to 8,000.

According to a second possibility, said pre-polymer can comprise or be constituted of at least two polyamide pre-polymers that are reactive relative to one another and each respectively carry two identical terminal functions X' or Y' (identical for same pre-polymer and different between the two pre-polymers), said function X' of a pre-polymer being able to react only with said function Y' of the other pre-polymer, in particular by condensation, more specifically with X' and Y' being amine and carboxy or carboxy end amine, respectively.

In this second possibility, said at least one reactive thermoplastic pre-polymer may be partially polymerized, optionally with the said chain extender, and has a number-average molecular weight (Mn) ranging from 500 to 10,000, preferably from 4,000 to 8,000.

According to a third possibility, said pre-polymer can comprise or be constituted of at least one pre-polymer of said thermoplastic polyamide polymer, carrying n terminal reactive functions X, selected from among: —NH2, —CO2H and —OH, preferably NH2 and —CO2H with n being 1 to 3, preferably from 1 to 2, more preferably 1 or 2, more particularly 2 and at least one chain extender Y-A'-Y, with A' being a hydrocarbon bisubstituent, bearing 2 identical terminal reactive functions Y, reactive by polyaddition with at least one function X of said prepolymer a1), preferably having a molecular mass less than 500, more preferably less than 400.

In this second possibility, said at least one reactive thermoplastic pre-polymer may be partially polymerized, optionally with said chain extender, and has a number-average molecular weight (Mn) ranging from 500 to 10,000, preferably from 4,000 to 8,000.

The number-average molecular weight Mn of said final polymer of the thermoplastic matrix is preferably in a range from 10000 to 40000, preferably from 12000 to 30000. These Mn values may correspond to inherent viscosities greater than or equal to 0.8, as determined in m-cresol according to standard ISO 307:2007 but by changing the solvent (use of m-cresol instead of sulfuric acid and the temperature being 20° C.).

Said reactive prepolymers according to the two options given above, have a number-average molecular weight Mn ranging from 500 to 10,000, preferably from 500 to 6,000, in particular from 2,500 to 6,000.

The Mn are determined in particular by calculation from the rate of the terminal functions determined by potentiometric titration in solution and the functionality of said pre-polymers. The masses Mn can also be determined by steric exclusion chromatography or by NMR.

The nomenclature used to define the polyamides is described in ISO standard 1874-1:2011 "Plastiques—Matériaux polyamides (PA) pour moulage et extrusion—Partie 1: Désignation", in particular on page 3 (Tables 1 and 2) and is well known to the person skilled in the art.

The polyamide can be a homopolyamide or a co-polyamide or a mixture thereof.

Advantageously, the pre-polymers making up the matrix are selected from among polyamides (PA), in particular selected from among aliphatic polyamides, cycloaliphatic polyamides, and semi-aromatic polyamides (polyphthalamides) optionally modified by urea units, and copolymers thereof, polymethyl methacrylate (PPMA) and copolymers thereof, polyether imides (PEI), polyphenylene sulfide (PPS), polyphenylene sulfone (PPSU), PVDF, polyether ketone ketone (PEKK), polyether ether ketone (PEEK), fluorinated polymers such as polyvinylidene fluoride (PVDF).

In one embodiment, the pre-polymers making up the matrix are selected from among polyamides (PA), in particular selected from among aliphatic polyamides, cycloaliphatic polyamides, and semi-aromatic polyamides (polyphthalamides) optionally modified by urea units, and copolymers thereof, polymethyl methacrylate (PPMA) and copolymers thereof, polyether imides (PEI), polyphenylene sulphone (PPSU), PVDF, polyether ketone ketone (PEKK), polyether ether ketone (PEEK), fluorinated polymers such as polyvinylidene fluoride (PVDF).

For the fluorinated polymers, it is possible to use a homopolymer of vinylidene fluoride (VDF with formula $CH_2=CF_2$) or a copolymer of VDF comprising, by weight, at least 50% by mass of VDF and at least one other monomer copolymerisable with VDF. The VDF content must be greater than 80% by mass, or better still 90% by mass, in order to ensure good mechanical and chemical resistance of the structural part, especially when it is subject to thermal and chemical stresses. The co-monomer must be a fluorinated monomer, for example vinyl fluoride.

For structural parts having to withstand high temperatures, aside from fluorinated polymers, according to the invention PAEK (polyaryletherketone) such as poly(ether ketones) PEK, poly(ether ether ketone) PEEK, poly(ether ketone ketone) PEKK, Poly(ether ketone ether ketone ketone) PEKEKK or PA with a high glass transition temperature Tg) are advantageously used.

Advantageously, said thermoplastic polymer is an amorphous polymer whose glass transition temperature is such that Tg≥80° C., in particular ≥100° C., particularly ≥120° C., in particular ≥140° C., or a semi-crystalline polymer whose melting temperature Tm≥150° C.

Advantageously, said at least one thermoplastic prepolymer is selected from among polyamides, PEKK, PEI and a mixture of PEKK and PEI.

Advantageously, said polyamide is selected from aliphatic polyamides, cycloaliphatic polyamides and semi-aromatic polyamides (polyphthalamides).

Advantageously, said aliphatic polyamide pre-polymer selected from:

polyamide 6 (PA-6), polyamide 11 (PA-11), polyamide 12 (PA-12), polyamide 66 (PA-66), polyamide 46 (PA-46), polyamide 610 (PA-610), polyamide 612 (PA-612), polyamide 1010 (PA-1010), polyamide 1012 (PA-1012), polyamide 11/1010 and polyamide 12/1010, or a mixture thereof or a copolyamide thereof, and the block copolymers, in particular polyamide/polyether (PEBA), and said semi-aromatic polyamide, is a semi-aromatic polyamide, optionally modified with urea units, in particular a PA MXD6 and a PA MXD10 or a semi-aromatic polyamide of formula X/YAr, as disclosed in EP1505099, in particular a semi-aromatic polyamide of formula A/XT in which A is selected from a unit obtained from at least one amino acid, at least one unit obtained from a lactam and at least one unit corresponding to the formula (Ca diamine, Cb diacid), with "a" representing the number of carbon atoms of the diamine and "b" representing the number of carbon atoms of the diacid, "a" and "b" each being between 4 and 36, advantageously between 9 and 18, the unit (Ca diamine) being selected from aliphatic diamines, linear or branched, cycloaliphatic diamines and alkylaromatic diamines and the unit (Cb diacid) being selected from aliphatic, linear or branched diacids, cycloaliphatic diacids and aromatic diacids;

X.T denotes a unit obtained from the polycondensation of a Cx diamine and terephthalic acid, with x representing the number of carbon atoms of the Cx diamine, x being between 6 and 36, advantageously between 9 and 18, in particular a polyamide with formula A/6T, A/9T, A/10T or A/11T, A being as defined above, in particular a polyamide PA 6/6T, a PA 66/6T, a PA 6I/6T, a PA MPMDT/6T, a PA PA11/10T, a PA 11/6T/10T, a PA MXDT/10T, a PA MPMDT/10T, a PA BACT/10T, a PA BACT/6T, PA 11/BACT, PA BACT/10T/6T.

T corresponds to terephthalic acid, MXD corresponds to m-xylylene diamine, MPMD corresponds to methylpentamethylene diamine and BAC corresponds to bis(aminomethyl)cyclohexane.

Advantageously, said polyamide is a semi-aromatic polyamide selected from a PA MPMDT/6T, a PA PA11/10T, PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T.

Fibrous Material:

Concerning the fibers constituting said fibrous material, they are notably continuous fibers of mineral, organic or plant origin in the form of rovings.

Advantageously, each individual tape comprising a number of fibers, in particular carbon fibers, selected from a multiple of 3,000 or 50,000 fibers.

Advantageously, each individual tape comprising a number of carbon fibers selected from m×12,000 fibers, n×24,000 fibers, and p×50,000 fibers, 270,000 fibers or 400,000 fibers, m being between 1 and 40, in particular 1 to 4, n being between 1 and 20, and p being between 1 and 10, in particular 1.

Advantageously, the grammage for the glass fiber is greater than or equal to 1,200 Tex, in particular greater than or equal to 2,400 Tex, greater than or equal to 4,800 Tex.

The mineral fibers include carbon fibers, glass fibers, basalt or basalt-based fibers, silica fibers, or silicon carbide fibers, for example.

The organic fibers include thermoplastic or thermosetting polymer-based fibers, such as semi-aromatic polyamide fibers, aramid fibers or polyolefin fibers, for example. Preferably, they are amorphous thermoplastic polymer-based and have a glass transition temperature Tg higher than the Tg of the polymer or thermoplastic polymer mixture constituting the pre-impregnation matrix when the latter is amorphous, or higher than the Tm of the polymer or thermoplastic polymer matrix constituting the pre-impregnation matrix when the latter is semi-crystalline. Advantageously, they are semi-crystalline thermoplastic polymer-based and have a melting temperature Tm higher than the Tg of the polymer or thermoplastic polymer mixture constituting the pre-impregnation matrix when the latter is amorphous, or higher than the Tm of the polymer or thermoplastic polymer matrix making up the pre-impregnation matrix when the latter is semi-crystalline. Thus, there is no melting risk for the organic fibers making up the fibrous material during the impregnation by the thermoplastic matrix of the final composite. The plant fibers include natural linen, hemp, lignin, bamboo, silk, in particular spider silk, sisal, and other cellulose fibers, in particular viscose. These plant fibers can be used pure, treated or coated with a coating layer, in order to facilitate the adherence and impregnation of the thermoplastic polymer matrix.

It can also correspond to fibers with support threads.

These component fibers can be used alone or in mixtures. Thus, organic fibers can be mixed with the mineral fibers to be pre-impregnated with thermoplastic polymer and to form the pre-impregnated fibrous material.

Preferably, the fibrous material is made up of continuous carbon, glass or silicon carbide fibers or mixture thereof, in particular carbon fibers. It is used in the form of a roving or several rovings.

In the impregnated materials, also called "ready to use", the polymer or mixture of thermoplastic impregnation polymers is distributed uniformly and homogeneously around the fibers. In this type of material, the thermoplastic impregnation polymer must be distributed as homogeneously as possible within the fibers in order to obtain minimal porosities, that is to say, minimal empty spaces between the fibers. Indeed, the presence of porosities in this type of material can act as stress concentration spots, during mechanical tensile stressing, for example, and which then form crack initiation points of the impregnated fibrous material and mechanically compromise it. A homogeneous distribution of the polymer or mixture of polymers therefore improves the mechanical strength and homogeneity of the composite material formed from these impregnated fibrous materials.

Thus, in the case of so-called "ready to use" impregnated materials, the fiber rate in said pre-impregnated fibrous material is between 45 to 65% by volume, preferably from 50 to 60% by volume, in particular from 54 to 60% by volume.

The impregnation rate can be measured by image analysis (using a microscope or photo or digital camera device, for example), of a cross-section of the ribbon, by dividing the surface area of the ribbon impregnated by the polymer by the total surface area of the product (impregnated surface plus surface of the porosities). In order to obtain a good quality image, it is preferable to coat the ribbon cut in its transverse direction with a standard polishing resin and to polish with a standard protocol allowing the observation of the sample under a microscope with at least 6× magnification.

Advantageously, the porosity level of said impregnated fibrous material is less than 10%, in particular less than 5%, particularly less than 2%.

It must be noted that a nil porosity level is difficult to achieve and that as a result, advantageously the porosity level is greater than 0% but less than the levels cited above.

The porosity level corresponds to the closed porosity level and can be determined either by electron microscopy, or as being the relative deviation between the theoretical density and the experimental density of said impregnated fibrous material as described in the examples section of the present invention.

Method for the Preparation of Tapes, in Particular in the Form of Strip and Thin Tape Tapes of fibrous material impregnated in the form of strip or thin tape, particularly single-layer tapes, may be prepared respectively in two or three steps:

A first step of pre-impregnation by a polymer matrix and a second step of heating to finalize the impregnation by means of at least one supporting part (E) and at least one heating system for the strip, and a third step of shaping and calibrating for the thin tape.

Advantageously, said at least one heating system is selected from an infrared lamp, an UV lamp, a convection heating, a microwave heating, a laser heating and a High Frequency (HF) heating.

First Step: Preimpregnation

The first step of pre-impregnation to produce a pre-impregnated fibrous material can be done according to techniques well known to the person skilled in the art and in particular selected from those disclosed above.

Thus they can be done by a preimpregnation technology by powder deposition, by molten route, in particular by pultrusion, by cross-head extrusion of molten polymer, by continuous passage of the fibers in an aqueous polymer powder dispersion or aqueous polymer particle dispersion or aqueous polymer emulsion or suspension, by fluidized bed, equipped or not with at least one supporter (E'), by spraying by nozzle or spray gun by dry route in a tank equipped or not equipped with at least one supporter (E').

The supporter can be a concave, convex or cylindrical compression roller, in particular it is cylindrical.

Figure 2:
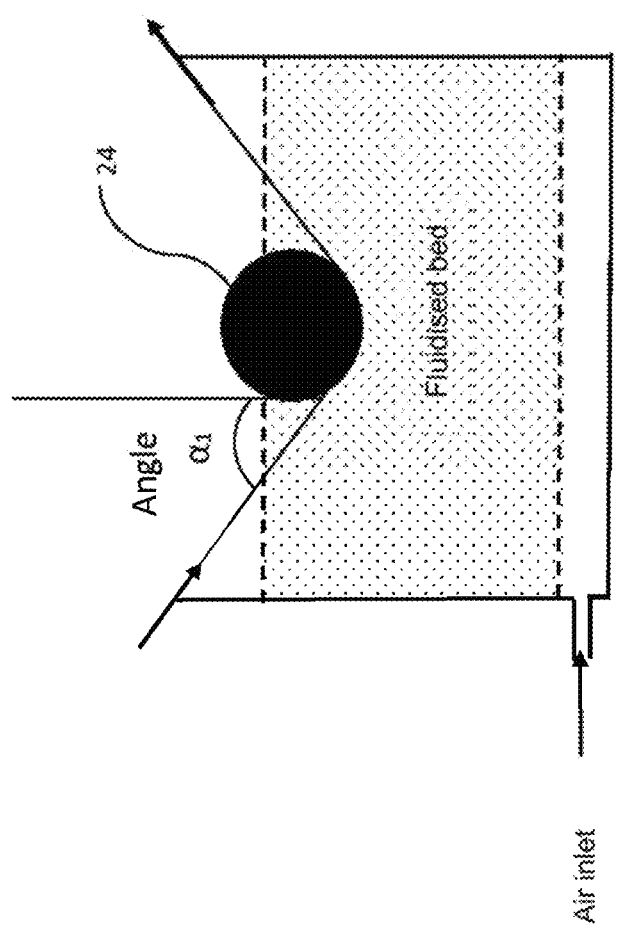
FIG. 2 shows an example of a tank comprising a fluidized bed in which the supporter is a cylindrical compression roller.

FIG. 1 shows an example of a tank provided with a supporter and FIG. 2 shows an example of a tank comprising a fluidized bed in which the supporter is a cylindrical compression roller.

The same tank can be used without a fluidized bed present and equipped with a spray gun.

The preimpregnation can also be done with the system such as defined above in which one or more supporter(s) (E'') is (are) present upstream from said system, in particular before the tank in which the preimpregnation is done.

It should be noted that the supporting parts (E) and (E'') can be identical or different whether in terms of the material or shape and its characteristics (diameter, length, width, height, etc. as a function of the shape).

Molten Route:

The preimpregnation step can be done by molten route, in particular by pultrusion.

Pre-impregnation techniques by molten route are known by those skilled in the art and are described in the references above.

The preimpregnation step is done in particular by cross-head extrusion of the polymer matrix and passage of said roving or rovings in this crosshead and then passage in the heated die, where the crosshead could be provided with fixed or rotating supporters on which the roving passes thus causing a spreading of said roving allowing a preimpregnation of said roving.

The pre-impregnation can in particular be done as described in US 2014/0005331A1, with the difference that the resin supply is done on two sides of said roving and there is no contact surface eliminating a portion of the resin on one of the two surfaces.

Advantageously, the pre-impregnation step is done by molten route at a high speed, that is to say, with a passage speed of said roving(s) greater than or equal to 5 m/min, in particular greater than 9 m/min.

Fluidized Bed:

The preimpregnation step can be done in fluidized bed.

An example unit for carrying out a manufacturing method without the heating step using at least one supporting part is described in international application WO 2015/121583.

This system describes the use of a tank comprising a fluidized bed for performing the pre-impregnation step and can be used in the context of the invention.

Advantageously, the tank comprising the fluidized bed is provided with at least one supporting part (E') (FIG. 1) which can be a compression roller (FIG. 2).

Supporting part (E') must be understood to mean any system on which the roving has the possibility of traveling in the tank. The supporting part (E') can have any shape as long as the roving can pass over it.

An example of supporting part (E'), without restricting the invention thereto, is disclosed in detail in FIG. 1.

It should be noted that the supporting parts (E) and (E') can be identical or different whether in terms of the material or shape and its characteristics (diameter, length, width, height, etc. as a function of the shape).

However, the supporting part (E') is not heating or heated.

The step for pre-impregnation of the fibrous material is carried out by passage of one or more rovings in a continuous pre-impregnation device, comprising a tank (10) provided with at least one supporting part (E') and comprising a fluidized powder bed (12) of said polymer matrix.

The powder of said polymer matrix or polymer is suspended in a gas G (air, for example) introduced into the tank and circulating in the tank (10) through a hopper (11). The roving(s) are circulated in this fluidized bed (12).

The tank can have any shape, in particular cylindrical or parallelepiped, particularly a rectangular parallelepiped or a cube, advantageously a rectangular parallelepiped.

The tank (10) can be an open or closed tank.

In the event the tank is closed, it is then equipped with a sealing system so that the powder of said polymer matrix cannot leave said tank.

This pre-impregnation step is therefore done by a dry route, that is to say, the thermoplastic polymer matrix is in powder form, in particular suspended in a gas, particularly air, but cannot be dispersed in a solvent or water.

Each roving to be pre-impregnated is unwound from a device with reels under the traction created by cylinders (not shown).

Each reel is provided with a brake (not shown) so as to apply tension on each fiber roving. In this case, an alignment module makes it possible to position the fiber rovings parallel to one another. In this way, the fiber rovings cannot be in contact with one another, which makes it possible to avoid mechanical damage to the fibers by friction relative to one another.

The fiber roving or the parallel fiber rovings then enter a tank (10), in particular comprising a fluidized bed (12), provided with a supporting part (E') that is a compression roller (24) in the case of FIG. 2. The fiber roving or the parallel fiber rovings next leave(s) the tank after pre-impregnation after optionally checking the residence time in the powder.

The expression "residence time in the powder" means the time during which the roving is in contact with said powder in the fluidized bed.

If the fibrous material, such as the glass or carbon fiber rovings, has a sizing, an optional step of de-sizing can be done before the fibrous material passes into the tank.

Advantageously, the tank used comprises a fluidized bed with a supporter and said preimpregnation step is done with a simultaneous spreading of said roving or rovings between the entry to and exit from the tank comprising said fluidized bed.

The expression "inlet of the tank" corresponds to the vertical tangent of the edge of the tank that comprises the fluidized bed.

The expression "outlet of the tank" corresponds to the vertical tangent of the other edge of the tank that comprises the fluidized bed.

The spreading consists of isolating each fiber making up said roving as much as possible from the other fibers which surround it in the space closest thereto. It corresponds to the transverse spreading of the roving.

In other words, the transverse separation or the width of the roving increases between the entry to the tank comprising the fluidized bed and the exit from the tank comprising the fluidized bed and thus makes an improved preimpregnation of the fibrous material possible.

The use of at least one supporter (E'), in particular a cylindrical compression roller, in the preimpregnation step, therefore makes an improved preimpregnation possible compared to the methods from the prior art.

The expression "compression roller" means that the roving that passes bears partially or wholly on the surface of said compression roller, which causes the spreading of said roving.

Advantageously, said at least one compression roller is cylindrical and the spreading percentage of said roving(s) between the inlet and the outlet of the tank of said fluidized bed is between 1% and 1000%, preferably from 100% to 800%, preferably from 200% to 800%, preferably from 400% to 800%.

The percentage of spreading is equal to the ratio of the final width of the roving to the initial width of the roving multiplied by 100.

The diameter of said at least one compression roller is from 3 mm to 500 mm, preferably from 10 mm to 100 mm, in particular from 20 mm to 60 mm.

Below 3 mm, the deformation of the fiber caused by the compression roller is too great.

Advantageously, the compression roller is cylindrical and not ribbed, and is in particular metallic.

When the supporting part (E') is at least one compression roller, according to a first variant, a single compression roller is present in the fluidized bed and said pre-impregnation is done at the angle $\alpha_1$ formed by said roving(s) between the inlet of said compression roller and the vertical tangent at said compression roller.

The angle $\alpha_1$ formed by said roving(s) between the inlet of said compression roller and the vertical tangent to said compression roller allows the formation of an area in which the powder will concentrate, thus leading to a "corner effect" that, with the simultaneous spreading of the roving by said compression roller, allows a pre-impregnation over a greater roving width and therefore an improved pre-impregnation compared to the techniques of the improved background art.

Throughout the description, all of the provided angle values are expressed in absolute values.

Advantageously, the angle $\alpha_1$ is comprised from 0 to 89°, preferably 5° to 85°, preferably 5° to 45°, preferably 5° to 30°.

Nevertheless, an angle $\alpha_1$ comprised from 0 to 5° is likely to give rise to risks of mechanical stress, which will lead to breakage of fibers and an angle $\alpha_1$ comprised from 85° to 89° does not create sufficient mechanical force for creating "the corner effect."

A value of the angle $\alpha_1$ equal to 0° therefore corresponds to a vertical fiber. It is clear that the height of the cylindrical compression roller is adjustable, thus making it possible to position the fiber vertically.

Advantageously, the inlet edge of the tank (23a) is equipped with a roller, in particular cylindrical and rotating, on which said roving(s) pass(es), thus leading to spreading prior to the pre-impregnation.

It is obvious that "the corner effect" caused by the angle $\alpha_1$ enhances the preimpregnation on one face but the spreading of said roving obtained with the compression roller also makes it possible to have a preimpregnation on the other face of said roving. In other words, said pre-impregnation is enhanced on one face of said roving or rovings at the angle $\alpha_1$ formed by said roving or rovings between the entry to said at least one compression roller $R_1$ and the vertical tangent to the compression roller $R_1$ but the spreading also makes pre-impregnation of the other face possible.

The angle $\alpha_1$ is as defined above.

Advantageously, the volume diameter D90 of the particles of thermoplastic polymer powder is from 30 to 500 μm, advantageously from 80 to 300 μm.

Advantageously, the volume diameter D10 of the particles of thermoplastic polymer powder is from 5 to 200 μm, advantageously from 15 to 100 μm.

Advantageously, the volume diameter of the particles of thermoplastic polymer powder is comprised in the ratio D90/D10, or from 1.5 to 50, advantageously from 2 to 10.

Advantageously, the average volume diameter D50 of the particles of thermoplastic polymer powder is from 10 to 300 μm, in particular from 30 to 200 μm, more particularly from 45 to 200 μm.

The volume diameters of the particles (D10, D50 and D90) are defined according to standard ISO 9276:2014.

"D50" corresponds to the average diameter by volume, that is to say, the value of the particle size that divides the examined population of particles exactly in half.

"D90" corresponds to the value at 90% of the cumulative curve of the particle size distribution by volume.

"D10" corresponds to the corresponds to the size of 10% of the volume of the particles.

According to other variants, two, three or more rollers can be present in the fluidized bed.

Spraying by Spray Gun:

The step of preimpregnation of the fibrous material can also be carried out by sending one or more rovings into a device for continuous preimpregnation by spraying that comprises a tank comprising one or more nozzle(s) or one or more gun(s) spraying the polymer powder on the fibrous material at the entry roller.

The powder from polymer(s) or polymer is sprayed on said fibrous material in the tank by means of nozzle(s) or spray gun(s) near the supporting part notably of the compression roller (on entry). The roving(s) are circulated in this tank.

Figure 3:
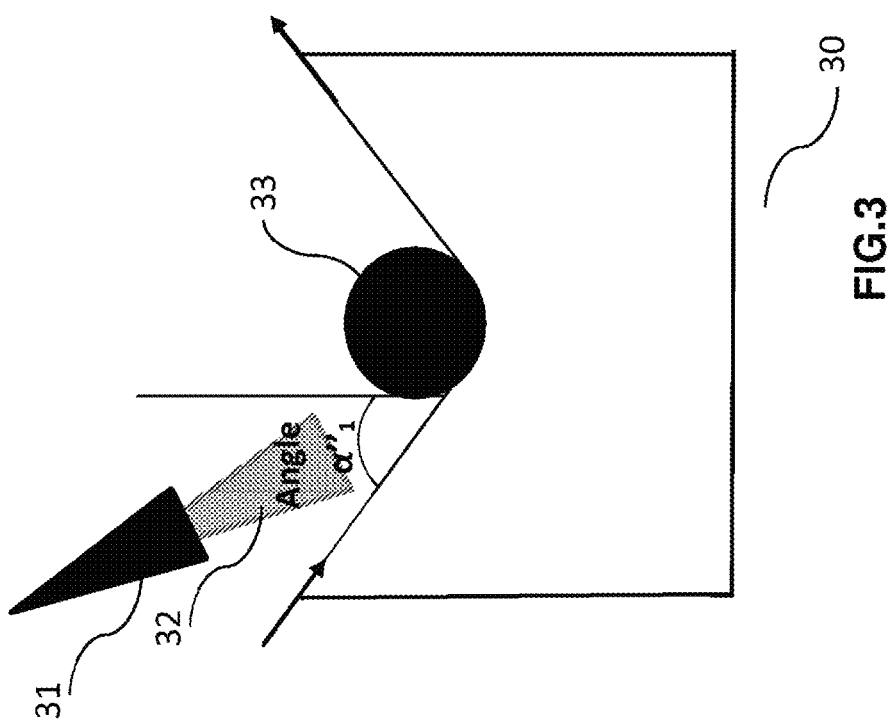
FIG. 3 shows an example with a spray gun.

An example with a spray gun is shown in FIG. 3, without being limited thereto.

All the characteristics of the supporters, and in particular the compression rollers, the spreading, and the angle $\alpha_1$ causing the corner effect and detailed for the fluidized bed are also valid for spraying by spray gun.

According to other variants, two, three or more rollers can be present each having a spray gun.

Second Step: Heating the Pre-Impregnated Fibrous Material and Finalizing the Impregnation.

The step of preimpregnation can therefore be done by any means provided or not with at least one supporter (E').

The presence of the supporter allows the spreading of the roving and improves the preimpregnation. However, the presence of this supporter is not indispensable as long as a heating system provided with at least one supporting part (E) is present after the pre-impregnation step to finalize the impregnation.

The expression "supporting part (E)" refers to any system on which the roving can pass. The supporting part (E) can have any shape as long as the roving can pass over it. It can be stationary or rotating.

The heating system is any system giving off heat or emitting radiation capable of heating the supporting part (E).

It can be selected from an infrared lamp, a UV lamp, convection heating, microwave heating, laser heating and High Frequency (HF) heating.

The supporting part (E) is therefore conductive or absorbs the radiation emitted by the heat.

The expression "heat-conducting supporting part (E)" means that the supporting part (E) is made from a material capable of absorbing and conducting heat.

It can also be a heating system using high frequency waves, microwaves or laser.

In this case, the supporting part does not conduct heat or does not absorb the radiation emitted by the heat.

The expression "non-heat-conducting supporting part (C)" means that the supporting part (E) is made up of material incapable of absorbing and conducting heat.

Said at least one supporting part (E) is located or comprised in the environment of the heating system, that is to say, it is not outside the heating system.

Advantageously, said heating system is mounted over said at least one supporting part (E). The heating system has a level sufficient so that the polymer present on the roving can melt but without breaking down said polymer.

Nevertheless, said heating system comprises either only said at least one supporting part (E), or may also comprise a portion of the roving, outside said supporting system (E), said roving portion being located before and/or after said supporting system (E).

Figure 4:
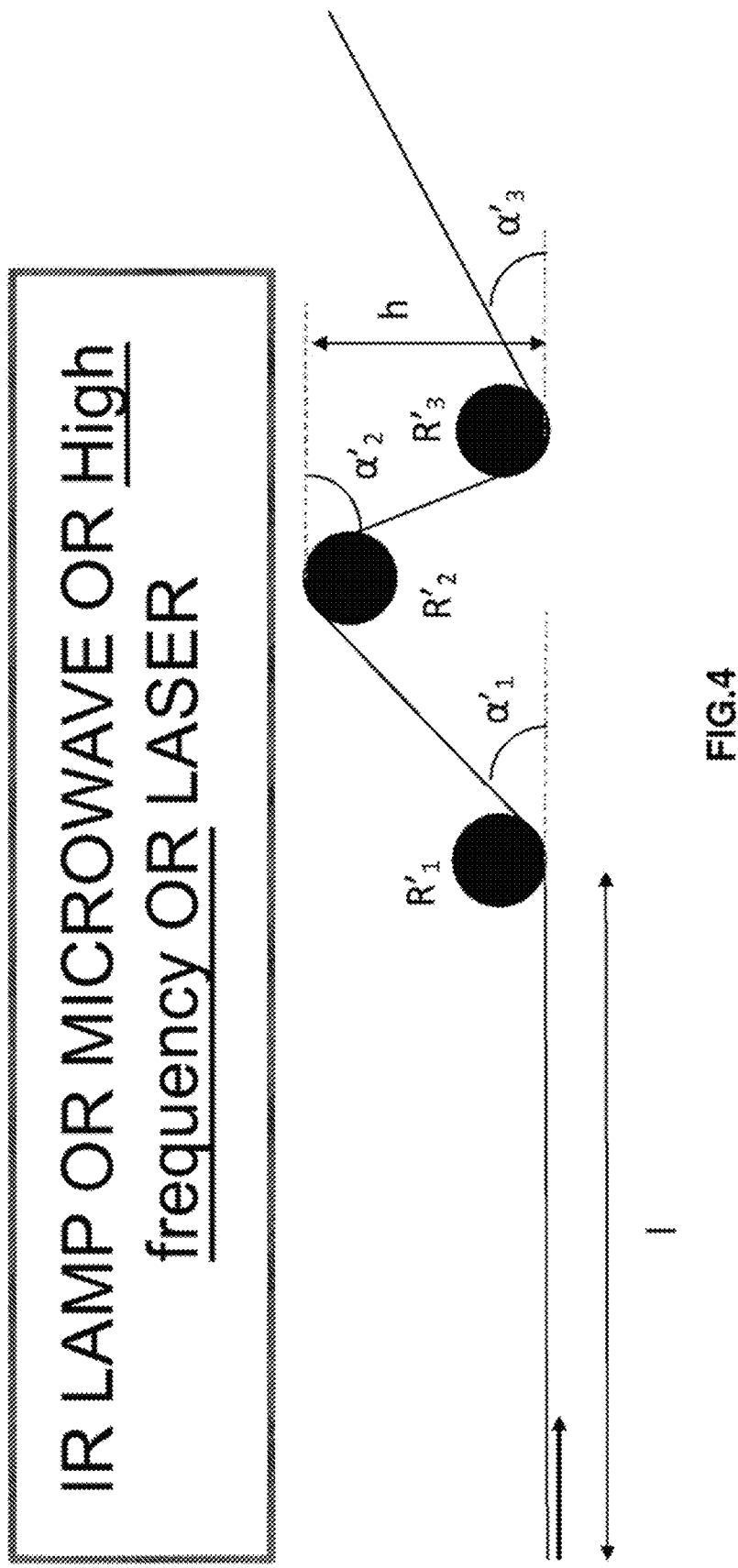
FIG. 4 shows an illustration of a heating system and of three supporters (E).

An illustration of a heating system and of three supporters (E), corresponding to $R'_1$, $R'_2$ and $R'_3$, is shown in FIG. 4, but is in no way limited thereto.

It is obvious that a second heating system can be present below the supporters, thus allowing uniform melting of said polymer on the two surfaces of the roving.

The heating system shown in FIG. 4 is a horizontal system. However, the heating system(s) can be positioned vertically also with vertical passage of the roving through the supporters.

As a result, this heating step makes it possible to perfect the impregnation of the roving done beforehand during the pre-impregnation step, and in particular to obtain a homogeneous impregnation to the core.

The term "homogeneous" means that the impregnation is uniform and that there are no dry, i.e., non-impregnated fibers, and that, conversely, there is no zone of pure resin without fiber in at least 95% of the volume of the tape of impregnated fibrous material.

Effectively, whatever the system used for the preimpregnation step, a first spreading occurs during that step, in particular if the preimpregnation step is done with the use of supporting parts (E'), such as in a fluidized bed with at least one supporter as described above.

A first spreading of the roving occurs at said compression rollers corresponding to the supporting parts (E') with "corner effect" due to the partial or complete passage of said roving over said supporting part(s) (E') and a second spreading occurs during the heating step, at said compression rollers corresponding to the supporting parts (E) due to the partial or complete passage of said roving over said supporting part(s) (E).

The heating system can be divided into two and therefore consists of two heating systems, a first heating system before said supporting parts (E) and a second heating system comprising said supporting parts. It is quite obvious that the distance between the two heating systems is then sufficient for the polymer to remain in the molten state.

The two heating systems may be of the same nature or of different nature and of identical or different power.

This second spreading is preceded during the passage of the roving in the heating system, before partial or full passage thereof over said supporter(s) (E), by the shrinkage of the roving because of the melting of the polymer on said roving.

This second spreading combined with the melting of said polymer matrix by the heating system and the retraction of the roving, make it possible to homogenize the pre-impregnation and thus to finalize the impregnation and to thus have an impregnation to the core and to have a high fiber content by volume, in particular constant in at least 70% of the volume of the tape, particularly in at least 80% of the volume of the tape, in particular in at least 90% of the volume of the tape, more particularly in at least 95% of the volume of the tape, as well as to decrease the porosity.

A roving of width $l_1$ before pre-impregnation therefore has a width $l_2 > l_1$ after pre-impregnation and a width $l_3 < l_2 > l_1$ after melting the polymer and shrinking said fibrous material pre-impregnated with said molten polymer.

After passing over the supporting part(s), the second expansion of the fibrous material comprising said molten polymer leads to a material having a width $l_4$ approximately equal to $l_2$ and having an average thickness of less than or equal to 100 μm.

The impregnated fibrous material then consists of a tape in the form of a strip of uncalibrated average width and thickness.

Advantageously, the spreading percentage during the heating step between the inlet of the first compression roller $R'_1$ and the outlet of the last compression roller $R'_i$ is about 0 to 300%, in particular 0 to 50%.

The various spreadings during the heating step combined with the melting of the thermoplastic polymer and the shrinkage of the roving during said heating step make it possible to produce an impregnated fiber content after the heating step between 45% to 65% by volume, preferably from 50 to 60% by volume, particularly from 54 to 60% (fiber content that cannot be reached by conventional techniques by molten route), where the fiber level by volume and the distribution of fibers is substantially identical on average on either side of the median plane of the fibrous material over the full length of said fibrous material thus leading to obtaining a notably single-layer fibrous material.

Below 45% fibers, the reinforcement is not of interest regarding the mechanical properties.

Above 65%, the limitations of the method are reached and the mechanical properties are lost again.

It is quite obvious that the average thickness $e_4$ depends on the content of impregnated fibers, the average thickness being in particular less than or equal to 100 μm for a content of impregnated fibers of between 45% and 65% by volume.

Heating of the pre-impregnated fibrous material without passing through the supporters (E) makes it possible to obtain tapes with an average thickness greater than 100 μm but less than 150 μm.

Advantageously, the porosity level in said impregnated fibrous material is less than 10%, in particular less than 5%, particularly less than 2%.

Shaping and Calibrating Step: Obtaining the Thin Tape

A step of shaping the roving or said parallel rovings and of calibrating said impregnated fibrous material when it takes place is carried out after leaving the second heating system.

This step can be carried out directly after leaving the second heating system and, in this case, the running speed of the roving is identical in the second and third heating systems or is delayed, which means that the running speed of the roving can be different between the second and third heating systems.

This step can be carried out according to one of the following embodiments:

1) passing a strip over one or more supporters (as defined for (E)) of which at least one supporter is notched (grooved), the average width of said strip being less than the notched (or grooved) supporter.

At least one of said supporters is located under a third heating system, particularly IR, microwave, high frequency or laser heating system, in particular IR heating system with a power (for each strip or stack of parallel strips) of between 0.1 W and 10 kW, more preferably between 0.1 and 6 kW, more preferably between 0.1 and 3 kW, even more preferably between 0.6 and 3 kW, even more preferably between 0.6 and 1.8 kW.

Advantageously, said at least one notched roller (41) is located first and is outside the third heating system (45). Advantageously, a second notched supporter (44) is present at the exit of the third heating system and outside said third heating system.

The passage over the non-notched supporters (42) and (43) makes it possible to re-expand the strip to the width of the notched supporter.

The diameter of the notched supporter or supporters (41) and (44) is between 12 mm and 50 mm, in particular between 12 mm and 30 mm.

The diameter of the non-notched supporter or supporters (42) and (43) is between 10 mm and 50 mm, in particular between 10 mm and 30 mm.

After passing under the third heating system, the strip is shaped to the width of the notched supporter at the exit of the third heating system, passes at the level of the heating calenders (46) mounted in series and equipped with an IR system of 1 kW each and whose power delivered is variable, outside the third heating system, to obtain the thin tape of less than 100 µm thickness.

Figure 7:
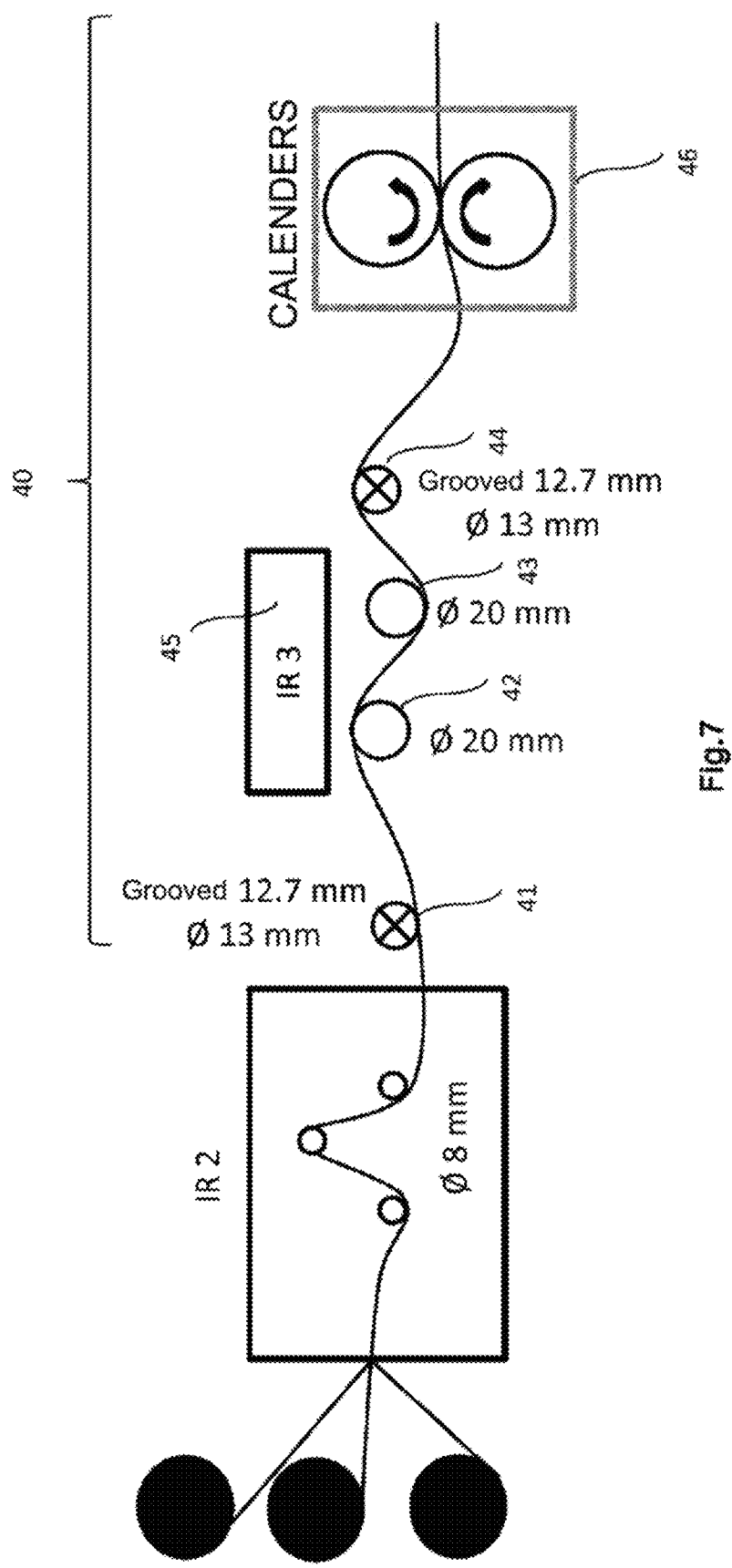
FIG. 7 shows an example of a single reel used and after passing through the IR2 system.

FIG. 7 (with a single reel used and after passing through the IR2 system) discloses an exemplary embodiment without being limited to the latter.

The supporters before IR3 and under IR3 are shown in FIG. 7 at the same level but they can be as in the second heating system at different heights. The notched supporters may also have the same or different diameter as the non-notched supporters.

2) passing a strip over one or more supporters (as defined for (E)) of which at least one supporter is notched (grooved), the average width of said strip being greater than the notched (or grooved) supporter.

Said supporters are located under a third heating system, particularly IR, microwave, high frequency or laser heating system, in particular IR heating system with a power (for each strip or stack of parallel strips) of between 0.1 W and 10 kW, more preferably between 0.1 and 6 kW, more preferably between 0.1 and 3 kW, even more preferably between 0.6 and 3 kW, even more preferably between 0.6 and 1.8 kW. Advantageously, said at least one notched roller is located first.

The passage over the first notched edge makes it possible to reduce the width of the strip below the width of the notched groove. Advantageously, a second notched supporter is present at the exit of the third heating system with a groove of width greater than the width of the strip.

After passing under the third heating system, the strip shaped to the width of the notched supporter at the exit of the third heating system, passes at the level of the heating calenders mounted in series and equipped with an IR system of 1 kW each, outside the third heating system, to obtain the thin tape of less than 100 µm thickness.

A calendering system with pressure and roll gap managed as disclosed in WO 2015/121583 can be used in both embodiments.

The supporter is in particular a fixed or rotary notched roller, or even a counter-rotating roller, in particular a fixed roller for gathering the said impregnated fibrous material to the right width.

The notched roller may also have rounded edges at the lateral contact points with the supporter to avoid damaging the fibers at the edge of the thin tape.

The expression "rounded edges" means that the bottom of the notch is concave or convex in shape.

The fibrous material impregnated after passing over the calender system then consists of a tape in the form of a thin tape having a final average width of less than $l_4$.

Advantageously, the first embodiment of the shaping and calibrating step is preferred.

Said thin tape has an average thickness of less than or equal to 100 µm for a content of impregnated fibers of between 45% and 65% by volume.

Advantageously, said thin tape has a final average width of less than $l_4$ and an average thickness of between 10 µm and 100 µm for a content of impregnated fibers of between 45% and 65% by volume.

This therefore makes it possible to work with high travel speeds and thus reduce the production costs.

Advantageously, the method according to the invention is carried out at a speed of at least 10 m/min, in particular of at least 20 m/min, preferably of at least 30 m/min.

Stacking and/or Joining Step

Several embodiments are possible:

1) After the step of impregnating and obtaining the strip (tape) disclosed above, or after the optional step of shaping and calibrating in thin tape (tape) defined above, a step of stacking and/or joining at least two tapes is carried out, said N tapes being capable of overlapping at least partially.

This step can be carried out according to several embodiments:

In a first variant (FIG. 7), the said at least two strips are stacked and/or joined by passing over one or more supporters (defined by (E)) of which at least one supporter is notched (grooved). At least one of said supporters is located under a third heating system, particularly IR, microwave, high frequency or laser heating system, in particular IR heating system with a power (for each strip or stack of parallel strips) of between 0.1 W and 10 kW, more preferably between 0.1 and 6 kW, more preferably between 0.1 and 3 kW, even more preferably between 0.6 and 3 kW, even more preferably between 0.6 and 1.8 kW.

Advantageously, a first notched (grooved) supporter of the desired size allows stacking and/or joining to the desired size outside the third heating system.

The strips stacked and/or joined to the desired dimension then pass over at least one non-notched supporter under said third heating system and then over a second notched supporter also under said third heating system.

Advantageously, two non-notched supporters are present under said third heating system.

After passing under the third heating system, the strips stacked and/or joined and shaped to the width of the notched supporter at the exit of the third heating system pass at the level of the heating calenders mounted in series and equipped with an IR system of 1 kW each with variable power (as a percentage of the maximum power), outside the third heating system, to obtain the web.

In a second variant, the first notched roller of the first variant is also placed under the third heating system.

In a third variant, said at least two strips pass over at least one supporter, optionally notched, provided with a heating system and then pass at the level of heating calenders mounted in series equipped with an IR system of 1 kW each with variable power (as a percentage of the maximum power), outside the third heating system, in order to obtain the web.

The notched or non-notched supporters used in the first, second and third variants have the following characteristics: The diameter of the notched supporter or supporters (41) and (44) is between 12 mm and 50 mm, in particular between 12 mm and 30 mm.

The diameter of the non-notched supporter or supporters (42) and (43) is between 10 mm and 50 mm, in particular between 10 mm and 30 mm.

In a fourth variant, said at least two strips are heated by at least one heating system and then pass at the level of heating calenders mounted in series equipped with an IR system of 1 kW each with variable power (as a percentage of the maximum power), outside the third heating system, in order to obtain the web.

In this embodiment, there are no supporters present in the heating system.

In a fifth variant, said at least two strips are heated and then passed through a hot drawing plate at the level of heating calenders mounted in series equipped with an IR system of 1 kW each with variable power (as a percentage of the maximum power), outside the third heating system, in order to obtain the web.

In this embodiment, there are no supporters present in the heating system.

2) The step of stacking and/or joining at least two strips is carried out during the impregnation step under IR2 and obtaining the strip disclosed above.

Said at least two stacked and/or joined strips are then subjected to one of the five variants of the first embodiment disclosed above.

As a general rule, the heating system with or without supporter is at a temperature which is greater than the Tm of the polymer. The heating calenders mounted in series are at a temperature between Tg and Tm of the polymer, advantageously between Tg+50° C. and Tg+80° C., as determined according to ISO 11357-2:2013.

Advantageous Embodiments of the Invention

Advantageously, the fibrous material is selected from carbon fiber and glass fiber.

Advantageously, the fibrous material is carbon fiber and each individual tape comprises a number of carbon fibers selected from m×12,000 fibers, n×24,000 fibers, and p×50,000 fibers, m being between 1 and 40, in particular 1 to 4, n being between 1 and 20, and p being between 1 and 10, in particular 1.

Advantageously, the thermoplastic polymer used to impregnate the carbon fiber is a semi-aromatic polyamide.

Advantageously, the thermoplastic polymer used to impregnate the carbon fiber is a semi-aromatic polyamide selected from a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T, a PEEK, PEKK and a PEI, or a mixture thereof.

Advantageously, the fibrous material is glass fiber and the grammage for the glass fiber is greater than or equal to 1,200 Tex, in particular greater than or equal to 2,400 Tex, greater than or equal to 4,800 Tex.

Advantageously, the thermoplastic polymer used to impregnate the glass fiber is a semi-aromatic polyamide.

Advantageously, the thermoplastic polymer used to impregnate the glass fiber is a semi-aromatic polyamide selected from a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T, a PEEK, PEKK and a PEI, or a mixture thereof.

Advantageously, the pre-impregnation of the carbon fiber fibrous material is carried out by fluidized bed and then a step of heating and finalizing the impregnation to obtain an impregnated fibrous material consisting of a tape in the form of a strip having an average thickness of less than or equal to 100 μm, in particular between 10 μm and 100 μm, said heating step being immediately subsequent to the pre-impregnation step.

Advantageously, the thermoplastic polymer constituting a tape in the form of a strip used to impregnate the carbon fiber is a semi-aromatic polyamide.

Advantageously, the thermoplastic polymer constituting a tape in the form of a strip used to impregnate the carbon fiber is a semi-aromatic polyamide selected from a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T, a PEEK, PEKK and a PEI, or a mixture thereof.

Advantageously, the stacking and/or joining of N tapes of fibrous materials in the form of a strip, said N tapes being capable of overlapping at least partially, is carried out by heating said strip by at least one heating system and then passing said strip over at least one notched supporter provided with a heating system and then passing over a heating calender.

Advantageously, the pre-impregnation of the carbon fiber fibrous material is carried out by fluidized bed and then a step of heating, of finalizing the impregnation, and of shaping and calibrating to obtain an impregnated fibrous material consisting of a tape in the form of a thin tape having an average thickness of less than or equal to 100 μm, in particular between 10 μm and 100 μm, said heating step being immediately subsequent to the pre-impregnation step.

Advantageously, the stacking and/or joining of N tapes of fibrous materials in the form of a thin tape, said N tapes being capable of overlapping at least partially, is carried out by heating said tape by at least one heating system and then passing said tape over at least one notched supporter provided with a heating system and then passing over a heating calender.

Advantageously, the thermoplastic polymer constituting a tape in the form of a thin tape used to impregnate the carbon fiber is a semi-aromatic polyamide.

Advantageously, the thermoplastic polymer constituting a tape in the form of a thin tape used to impregnate the carbon fiber is a semi-aromatic polyamide selected from a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T, a PEEK, PEKK and a PEI, or a mixture thereof.

Advantageously, the pre-impregnation of the glass fiber fibrous material is carried out by fluidized bed and then a step of heating and finalizing the impregnation to obtain an impregnated fibrous material consisting of a tape in the form of a strip having an average thickness of less than or equal to 100 µm, in particular between 10 µm and 100 µm, said heating step being immediately subsequent to the pre-impregnation step.

Advantageously, the thermoplastic polymer constituting a tape in the form of a strip used to impregnate the glass fiber is a semi-aromatic polyamide.

Advantageously, the thermoplastic polymer constituting a tape in the form of a strip used to impregnate the glass fiber is a semi-aromatic polyamide selected from a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T, a PEEK, PEKK and a PEI, or a mixture thereof.

Advantageously, the stacking and/or joining of N tapes of fibrous materials in the form of a strip, said N tapes being capable of overlapping at least partially, is carried out by heating said strip by at least one heating system and then passing said strip over at least one supporter provided with a heating system and then passing over a heating calender.

Advantageously, the pre-impregnation of the glass fiber fibrous material is carried out by fluidized bed and then a step of heating and finalizing the impregnation to obtain an impregnated fibrous material consisting of a tape in the form of a thin tape having an average thickness of less than or equal to 100 µm, in particular between 10 µm and 100 µm, said heating step being immediately subsequent to the pre-impregnation step.

Advantageously, the thermoplastic polymer constituting a tape in the form of a thin tape used to impregnate the glass fiber is a semi-aromatic polyamide.

Advantageously, the thermoplastic polymer constituting a tape in the form of a thin tape used to impregnate the glass fiber is a semi-aromatic polyamide selected from a PA MPMDT/6T, a PA PA11/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/10T, PA 11/BACT/10T, a PA 11/MXDT/10T, a PEEK, PEKK and a PEI, or a mixture thereof.

Advantageously, the stacking and/or joining of N tapes of fibrous materials in the form of a thin tape, said N tapes being capable of overlapping at least partially, is carried out by heating said tape by at least one heating system and then passing said tape over at least one supporter provided with a heating system and then passing over a heating calender.

FIG. 1 describes a tank (10) comprising a fluidized bed (12) with a supporting part, the height (22) of which is adjustable. The edge of the inlet of the tank is equipped with a rotating roller 23a over which the roving 21a passes and the edge of the tank outlet is equipped with a rotating roller 23b over which the roving 21b passes.

FIG. 2 describes an embodiment with a single compression roller, with a tank (10) comprising a fluidized bed (12) in which a single cylindrical compression roller (24) is present and showing the angle $\alpha_1$.

The arrows at the fiber indicate the passage direction of the fiber.

FIG. 3 shows an embodiment with a single compression roller, with a tank (30) comprising a spray gun (31) for spaying powder (32) in which a single cylindrical compression roller (33) is present and showing the angle $\alpha''_1$.

The arrows at the fiber indicate the passage direction of the fiber.

FIG. 4 shows a diagram of a single heating system for heating the pre-impregnated fibrous material and finalizing the impregnation with three rollers for finalizing the impregnation.

Figure 5:
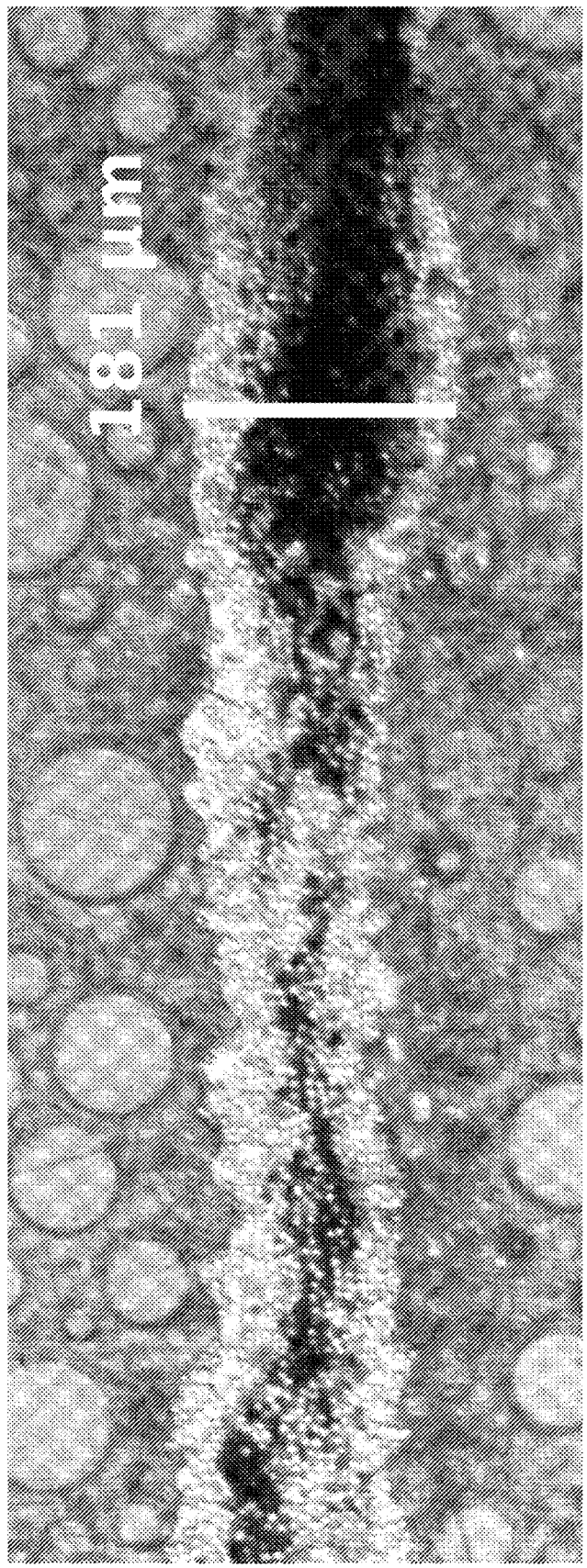
FIG. 5 shows a photo taken under an optical microscope of a cross sectional view of an SGL.

FIG. 5 shows a photo taken under an optical microscope of a cross sectional view of an SGL, 50K carbon fiber roving impregnated with a PA BACT/10T polyamide powder of D50=108 µm (D90=198 µm and D10=48.3 µm) according to example 1 and disclosed in WO 2015/121583 (before calendaring).

The method according to WO 2015/121583 leads to a fibrous material which is too thick (181 µm), and lacks homogeneity in several areas of the impregnated roving and also a major porosity and a bad distribution of fibers.

The diameter of a fiber represents 7 µm.

Figure 6:
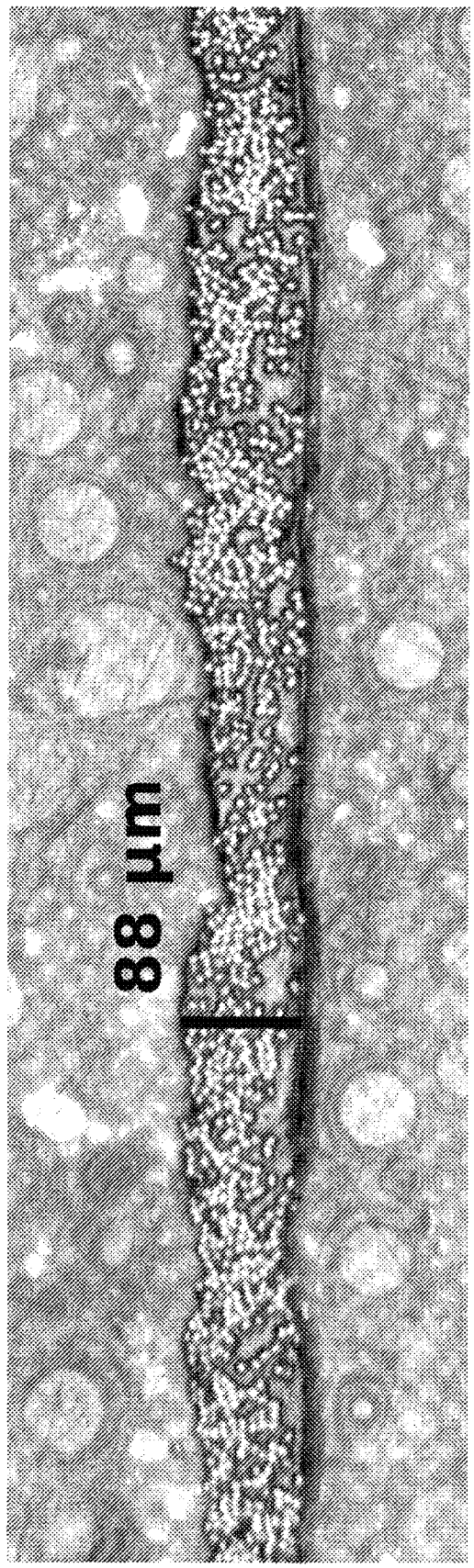
FIG. 6 shows a photo taken under an optical microscope of a cross-sectional view of an SGL.

FIG. 6 shows a photo taken under an optical microscope of a cross-sectional view of an SGL, 50K carbon fiber roving impregnated with a PA BACT/10T polyamide powder (41/59 molar ratio) of D50=108 µm (D90=198 µm and D10=48.3 µm) according to the invention example 2 (before calendaring).

The diameter of a fiber represents 7 µm.

The strip obtained has an average thickness of less than 88 µm with a content of fibers by volume of 55%.

FIG. 7 shows an embodiment (40) of the stacking of three strips (obtained in FIG. 6), shaped to 12.7 mm to obtain a 12.7 mm wide web.

This embodiment comprises the passage in parallel of three fibrous materials in the second heating system and then stacking of the three strips at the level of the first notched supporter (41) (diameter 13 mm, groove 12.7 mm) outside the infrared system (45 (IR3)), then two non-notched supporters (42) and (43) (diameter 20 mm) and one notched supporter (44) (diameter 13 mm, groove 12.7 mm) under IR system (45) and heating calenders (46) mounted in series equipped with an IR system of 1 kW each and whose power is variable.

Figure 8:
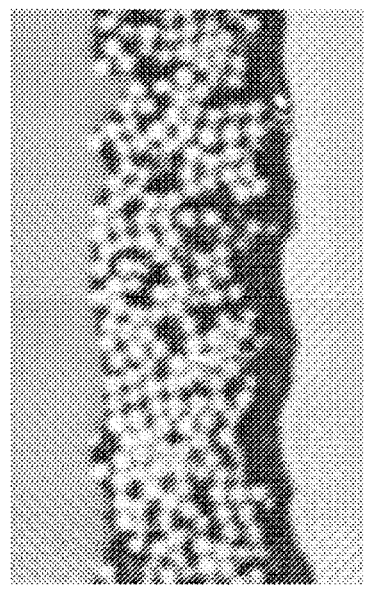
FIG. 8 shows a photo taken under an optical microscope of a cross-sectional view of a Toray (T700 12k 31E) carbon fiber roving impregnated with a PA 11/BACT polyamide powder (33/67 molar ratio) of D50=108 μm (D90=198 μm and D10=48.3 μm) according to example 2 (before calendaring).

FIG. 8 shows a photo taken under an optical microscope of a cross-sectional view of a Toray (T700 12k 31E) carbon fiber roving impregnated with a PA 11/BACT polyamide powder (33/67 molar ratio) of D50=108 µm (D90=198 µm and D10=48.3 µm) according to the invention example 2 (before calendaring).

The diameter of a fiber represents 7 µm.

The strip obtained has an average thickness of less than 63 µm with a content of fibers by volume of 55%.

Figure 9:
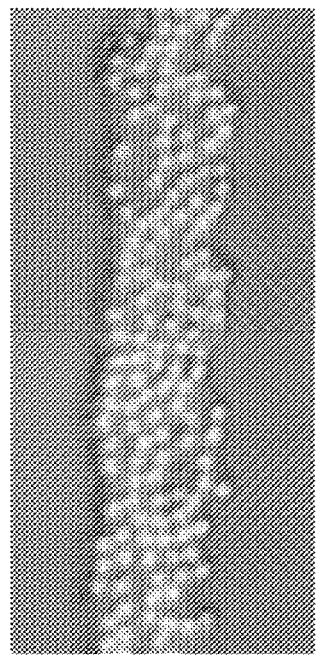
FIG. 9 shows a photo taken under an optical microscope of a cross-sectional view of a Toray (T700 12k 31E) carbon fiber roving impregnated with a PA 6I/6T polyamide powder (45/55 molar ratio) of D50=136 μm (D90=225 μm and D10=75 μm) according to the example 3 (before calendaring).

FIG. 9 shows a photo taken under an optical microscope of a cross-sectional view of a Toray (T700 12k 31E) carbon fiber roving impregnated with a PA 6I/6T polyamide powder (45/55 molar ratio) of D50=136 µm (D90=225 µm and D10=75 µm) according to the invention example 3 (before calendaring).

The diameter of a fiber represents 7 µm.

The strip obtained has an average thickness of less than 63 µm with a content of fibers by volume of 55%.

Figure 10:
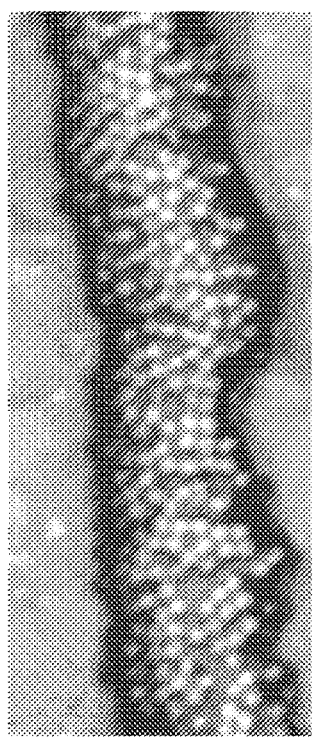
FIG. 10 shows a photo taken under an optical microscope of a cross-sectional view of a carbon fiber roving (Toray T700 12k 31E carbon fiber) impregnated with a PA MPMDT/10T powder (41/59 molar ratio) of D50=157 μm (D90=301 μm and D10=58 μm) according to the example 4 (before calendaring).

FIG. 10 shows a photo taken under an optical microscope of a cross-sectional view of a carbon fiber roving (Toray T700 12k 31E carbon fiber) impregnated with a PA MPMDT/10T powder (41/59 molar ratio) of D50=157 µm (D90=301 µm and D10=58 µm) according to the invention example 4 (before calendaring).

The diameter of a fiber represents 7 µm.

The strip obtained has an average thickness of less than 63 µm with a content of fibers by volume of 55%.

Example 1

Preparation of a Web 12.7 mm Wide and 250 µm Thick
Single Layer Fibrous Material (SGL, 50K Carbon Fiber), Impregnated with BACT/10T (41/59 Molar Ratio)

The following procedure was carried out:

Four cylindrical and fixed rollers with 8 cm diameter are present upstream from the tank comprising the fluidized bed on which the roving travels.

The rollers are 54 cm apart (distance between the central axis of the first roller and the central axis of the last roller).
Preimpregnation Step by Fluidized Bed A cylindrical compression roller $R_1$ in the tank (L=500 mm, I=500 mm, H=600 mm), diameter 25 mm, as shown in FIG. 2.

Residence time of 0.3 s in the powder
Angle $\alpha_1$ of 25°
D50=108 µm, (D10=48.3 µm, D90=198 µm) for the BACT/10T powder.
edge of the tank equipped with a stationary roller.

Step of Heating the Pre-Impregnated Fibrous Material and Finalizing the Impregnation.

The heating system used is that disclosed in FIG. 4, but with eight stationary cylindrical rollers $R'_1$ to $R'_8$ with a diameter of 8 mm.

The speed of advance of the roving is 10 m/min.

The infrared used has a total power of 25 kW, the height between the infrared and the upper roller is 4 cm and the height between the infrared and the lower rollers is 9 cm.

The angles $\alpha'_1$ to $\alpha'_8$ are identical and 25°.
The height h is 20 mm.
The length l is 1000 mm.
The eight rollers are each separated by 43 mm.

FIG. 6 shows the impregnated fibrous material obtained (strip) which has a thickness of 88 µm.

The resulting fibrous material is a single layer material which has an impregnation homogeneity and a low porosity with a very good distribution of the fibers.

Stacking Step

FIG. 7 details this step.

Three strips obtained in the preceding step are stacked at the level of a first notched supporter (41) (diameter 13 mm, groove 12.7 mm) outside infrared system (45 (IR3)), then the three stacked strips pass over two non-notched supporters (42) and (43) (diameter 20 mm), then a notched supporter (44) (diameter 13 mm, groove 12.7 mm) under IR system (45) and finally through heating calenders (46) mounted in series equipped with an IR system of 1 kW each.

The web obtained has a width of 12.7 mm and a thickness of 250 µm.

Example 2: Preparation of a Web 12.4 mm Wide and 189 µm Thick

Single-Layer Fibrous Material (Toray T700 12k 31E Carbon Fiber) Impregnated with PA 11/BACT Powder (33/67 Molar Ratio) of D50=114 µm, (D10=56 µm, D90=199 µm).

The same procedure as for Example 1 is used for the preparation of the strips and then the stacking of the strips. The notched supporters have a 12.4 mm groove.

The web obtained is 12.4 mm wide and 189 µm thick for a grammage of 194 g/m² of carbon fiber.

Example 3: Preparation of a Web 12.4 mm Wide and 189 µm Thick

Single-Layer Fibrous Material (Toray T700 12k 31E Carbon Fiber) Impregnated with PA 6I/6T Powder (45/55 Molar Ratio) of D50=136 µm, (D90=225 µm, D10=75 µm).

The same procedure as for Example 1 is used for the preparation of the strips and then the stacking of the strips. The notched supporters have a 12.4 mm groove.

The web obtained is 12.4 mm wide and 189 µm thick for a grammage of 194 g/m² of carbon fiber.

Example 4: Preparation of a Web 12.4 mm Wide and 189 µm Thick

Single-Layer Fibrous Material (Toray T700 12k 31E Carbon Fiber) Impregnated with PA MPMDT/10T Powder (41/59 Molar Ratio) of D50=157 µm, (D90=301 µm, D10=58 µm).

The same procedure as for Example 1 is used for the preparation of the strips and then the stacking of the strips. The notched supporters have a 12.4 mm groove.

The web obtained is 12.4 mm wide and 189 µm thick for a grammage of 194 g/m² of carbon fiber.

The invention claimed is:

1. A web of impregnated fibrous material(s) comprising N individual tapes of fibrous material(s) stacked and/or joined in relation to one another, said N individual tapes adhering to each other and being capable of overlapping at least partially, said individual tapes of fibrous material(s) comprising continuous fibers impregnated with at least one thermoplastic polymer, and optionally a chain extender,
wherein said web has a cross-section surface area (S), said surface area being perpendicular to an axis of the fibers and being substantially equal to a sum of surface areas for each initial individual tape in the cross-section perpendicular to the axis of the fibers,
wherein the sum of surface areas for each initial individual tape ($S_{th}$) is equal to N×l×Ep,
wherein l represents an average width of each tape in the cross-section surface area and Ep represents an average thickness of each tape in the cross-section surface area, the average thickness of each individual tape being less than or equal to 150 µm,
wherein N is between 2 and 2,000, and
wherein the at least one thermoplastic polymer does not include polyphenylene sulphides,
wherein said at least one thermoplastic polymer is a partially polymerized reactive thermoplastic prepolymer, optionally with the chain extender, and has a number-average molecular weight (Mn) ranging from 500 to 10,000,
wherein said at least one partially polymerized reactive thermoplastic prepolymer comprises at least one reactive prepolymer carrying on the same chain two terminal functions X' and Y', functions that respectively react together by condensation, with X' and Y' being amine and carboxy or carboxy and amine respectively.

2. A web of impregnated fibrous material(s) comprising N individual tapes of fibrous material(s) stacked and/or joined in relation to one another, said N individual tapes adhering to each other and being capable of overlapping at least partially, said individual tapes of fibrous material(s) comprising continuous fibers impregnated with at least one thermoplastic polymer, and optionally a chain extender,
wherein said web has a cross-section surface area (S), said surface area being perpendicular to an axis of the fibers and being substantially equal to a sum of surface areas for each initial individual tape in the cross-section perpendicular to the axis of the fibers, wherein the sum of surface areas for each initial individual tape ($S_{th}$) is equal to N×l×Ep, wherein l represents an average width of each tape in the cross-section surface area and Ep represents an average thickness of each tape in the cross-section surface area, the average thickness of each individual tape being less than or equal to 150 µm, wherein N is between 2 and 2,000, and wherein the at least one thermoplastic polymer does not include polyphenylene sulphides, wherein said at least one thermoplastic polymer is a partially polymerized reactive thermoplastic prepolymer, optionally with the chain extender, and has a number-average molecular weight (Mn) ranging from 500 to 10,000, wherein said at least one partially polymerized reactive thermoplastic prepolymer comprises at least two polyamide prepolymers that react together and each carry respectively two identical terminal functions X' or Y', where said function X' of a prepolymer can react only with said function Y' of the other prepolymer.

3. A web of impregnated fibrous material(s) comprising N individual tapes of fibrous material(s) stacked and/or joined in relation to one another, said N individual tapes adhering to each other and being capable of overlapping at least partially, said individual tapes of fibrous material(s) comprising continuous fibers impregnated with at least one thermoplastic polymer, and optionally a chain extender, wherein said web has a cross-section surface area (S), said surface area being perpendicular to an axis of the fibers and being substantially equal to a sum of surface areas for each initial individual tape in the cross-section perpendicular to the axis of the fibers, wherein the sum of surface areas for each initial individual tape ($S_{th}$) is equal to N×l×Ep, wherein l represents an average width of each tape in the cross-section surface area and Ep represents an average thickness of each tape in the cross-section surface area, the average thickness of each individual tape being less than or equal to 150 µm, wherein N is between 2 and 2,000, and wherein the at least one thermoplastic polymer does not include polyphenylene sulphides, wherein the porosity level in said web of impregnated fibrous material is less than 10%.

4. The web of impregnated fibrous material(s) according to claim 3, wherein $$N=\Sigma_{i=1}^{Nl}\Sigma_{j=1}^{Nep}N_{ij},$$

Nl being the number of individual tapes forming the width of the web and Nep being the number of individual tapes forming the thickness of the web, wherein each individual tape in the web comprises a number of carbon fibers selected from m×12K fibers, n×24K fibers, p×48K fibers, q×50K fibers, and w×400K fibers, m being between 1 and 40, n being between 1 and 20, q being between 1 and 10, p being between 1 and 10, and w is equal to 1.

5. The web of impregnated fibrous material according to claim 4, wherein the average thickness and the average width of the N individual tapes are identical, the average thickness of the web ($\bar{e}$) being equal to $\overline{Nep}\times er$, $\overline{Nep}$ being the average number of tapes in the thickness direction of the web, er being the average thickness of an individual tape, and the average width of the web ($\bar{l}$) being equal to $\overline{Nl}\times lr$, $\overline{Nl}$ being the average number of tapes in the width direction of the web, and lr being the average width of an individual tape.

6. The web of impregnated fibrous material according to claim 5, wherein the number of tapes in the thickness Nep is at most 4 and the number of tapes in the width Nl is at most 94, and wherein one of Nep or Nl is at least 1 and the other is at least 2.

7. The web of impregnated fibrous material according to claim 6, wherein the number of tapes in the thickness Nep is selected from 2 or 4 and the number of tapes in the width Nl equals 1.

8. The web of impregnated fibrous material according to claim 6, wherein the number of tapes in the thickness Nep equals 1 and the number of tapes in the width Nl is selected from 24 or 32.

9. The web of impregnated fibrous material according to claim 6, wherein the number of tapes in the thickness Nep equals 2 and the number of tapes in the width Nl is selected from 46, 62 or 92.

10. The web of impregnated fibrous material according to claim 4, wherein the average thickness and the average width of the N individual tapes are identical, the average thickness of the web ($\bar{e}$) being less than $\overline{Nep}\times er$, $\overline{Nep}$ being the average number of tapes in the thickness direction of the web, er being the average thickness of each individual tape, and the average width of the web ($\bar{l}$) being less than $\overline{Nl}\times lr$, $\overline{Nl}$ being the average number of tapes in the width direction of the web, and lr being the average width of each individual tape.

11. The web of impregnated fibrous material according to claim 4, wherein the average thickness and the average width of the N individual tapes are identical, the average thickness of the web ($\bar{e}$) being greater than $\overline{Nep}\times er$, $\overline{Nep}$ being the average number of tapes in the thickness direction of the web, er being the average thickness of each individual tape, and the average width of the web ($\bar{l}$) being greater than $\overline{Nl}\times lr$, $\overline{Nl}$ being the average number of tapes in the width direction of the web, and lr being the average width of each individual tape.

12. The web of impregnated fibrous material according to claim 4, wherein the N individual tapes are stacked, the number of tapes in the width Nl being equal to 1 and the number of tapes in the thickness Nep being between 2 and 2,000.

13. The web of impregnated fibrous material according to claim 4, wherein the N individual tapes are joined, the number of tapes in the thickness Nep being equal to 1 and the number of tapes in the width Nl being between 2 and 2,000.

14. The web of impregnated fibrous material according to claim 4, wherein the N individual tapes are stacked and joined in relation to one another.

15. The web of impregnated fibrous material according to claim 4, wherein the average thickness and/or width of the N individual tapes is different.

16. The web of impregnated fibrous material according to claim 3, wherein the thickness of said web consisting of said N individual tapes stacked and/or joined in relation to one another is variable over its width.

17. The web of impregnated fibrous material according to claim 3, wherein the thickness of said web consisting of said N individual tapes stacked and/or joined in relation to one another is constant over its entire width.

18. The web of impregnated fibrous material according to claim 3, wherein the fiber content by volume is constant in at least 70% of the volume of each N individual tapes of fibrous material stacked and/or joined of said web, said N individual tapes being capable of overlapping at least partially.

19. The web of impregnated fibrous material according to claim 3, wherein the fiber content is between 45 to 65% by volume for each N individual tapes of fibrous material stacked and/or joined of said web, said N tapes being capable of overlapping at least partially, in said web.

20. The web of impregnated fibrous material according to claim 3, wherein said N individual tapes of fibrous material have no chain extender, and said at least one thermoplastic polymer is a non-reactive amorphous polymer whose glass transition temperature is at least 80° C., or a non-reactive semi-crystalline polymer whose melting temperature at least 150° C.

21. The web of impregnated fibrous material according to claim 3, wherein said at least one thermoplastic polymer is a partially polymerized reactive thermoplastic prepolymer, optionally with the chain extender, and has a number-average molecular weight (Mn) ranging from 500 to 10,000.

22. The web of impregnated fibrous material according to claim 21, wherein said at least one partially polymerized reactive thermoplastic prepolymer with said chain extender comprises:
   a1) at least one reactive thermoplastic prepolymer, bearing n reactive terminal functions X, selected from: $-NH_2$, $-CO_2H$ and $-OH$, with n being from 1 to 3; and
   a2) at least one chain extender Y-A'-Y, with A' being a hydrocarbon bisubstituent, bearing 2 identical terminal reactive functions Y, reactive by polyaddition with at least one function X of the at least one reactive thermoplastic prepolymer.

23. The web of impregnated fibrous material according to claim 21, wherein said at least one partially polymerized reactive thermoplastic prepolymer comprises at least one reactive prepolymer carrying on the same chain two terminal functions X' and Y', functions that respectively react together by condensation, with X' and Y' being amine and carboxy or carboxy and amine respectively.

24. The web of impregnated fibrous material according to claim 21, wherein said at least one partially polymerized reactive thermoplastic prepolymer comprises at least two polyamide prepolymers that react together and each carry respectively two identical terminal functions X' or Y', where said function X' of a prepolymer can react only with said function Y' of the other prepolymer.

25. The web of impregnated fibrous material according to claim 3, wherein said N individual tape(s) of fibrous material consist of the at least one thermoplastic polymer.

26. The web of impregnated fibrous material according to claim 3, wherein said at least one thermoplastic polymer is selected from: polyaryl ether ketones (PAEK); polyaryl ether ketone ketone (PAEKK); aromatic polyether imides (PEI); polyaryl sulfones; polyarylsulfides; polyamides (PA); PEBAs; polyacrylates; polyolefins; and mixtures thereof.

27. The web of impregnated fibrous material according to claim 3, wherein said at least one thermoplastic polymer is selected from polyamides, PEKK, PEI and a mixture of PEKK and PEI.

28. The web of impregnated fibrous material according to claim 27, wherein said polyamide is selected from aliphatic polyamides, cycloaliphatic polyamides and semi-aromatic polyamides (polyphthalamides).

29. The web of impregnated fibrous material according to claim 28, wherein said aliphatic polyamide is selected from polyamide 6 (PA-6), polyamide 11 (PA-11), polyamide 12 (PA-12), polyamide 66 (PA-66), polyamide 46 (PA-46), polyamide 610 (PA-610), polyamide 612 (PA-612), polyamide 1010 (PA-1010), polyamide 1012 (PA-1012), polyamide 11/1010, polyamide 12/1010, or a mixture thereof or a copolyamide thereof, and block copolymers, and
   said semi-aromatic polyamide is either a semi-aromatic polyamide modified with urea units selected from MXD6 and MXD10, or is a semi-aromatic polyamide of formula A/XT, in which:
   A is a unit obtained from an amino acid, a unit obtained from a lactam or a unit corresponding to the formula (Ca diamine).(Cb diacid),
      wherein "a" represents the number of carbon atoms of the diamine and "b" represents the number of carbon atoms of the diacid, "a" and "b" each being between 4 and 36,
      wherein the unit (Ca diamine) is selected from aliphatic diamines, linear or branched, cycloaliphatic diamines or alkylaromatic diamines,
      wherein the unit (Cb diacid) is selected from aliphatic, linear or branched diacids, cycloaliphatic diacids and aromatic diacids; and
   in which XT denotes a unit obtained from a polycondensation of a Cx diamine and terephthalic acid, with x representing the number of carbon atoms of the Cx diamine, x being between 6 and 36.

30. The web of impregnated fibrous material according to claim 27, wherein said polyamide is a semi-aromatic polyamide selected from a PA MPMDT/6T, a PA PA11/10T, a PA 11/6T/10T, PA 11/BACT, a PA MXDT/10T, a PA MPMDT/10T, a PA BACT/10T, a PA BACT/6T, PA BACT/10T/6T, a PA 11/BACT/6T, a PA 11/MPMDT/10T, a PA 11/BACT/10T, or a PA 11/MXDT/10T.

31. The web of impregnated fibrous material according to claim 3, wherein said fibrous material comprises continuous fibers selected from carbon, glass, silicon carbide, basalt or basalt-based fibers, silica, natural fibers, amorphous thermoplastic polymer-based fibers with a glass transition temperature Tg higher than the Tg of the at least one thermoplastic polymer when the latter is amorphous, amorphous thermoplastic polymer-based fibers with a melting temperature higher than the Tm of the at least one thermoplastic polymer when the latter is semi-crystalline, semi-crystalline thermoplastic polymer-based fibers with a melting temperature Tm higher than the Tg of the at least one thermoplastic polymer when the latter is amorphous, semi-crystalline thermoplastic polymer-based fibers with a melting temperature Tm higher than the Tm of the at least one thermoplastic polymer when the latter is semi-crystalline, or a mixture of two or more of said fibers.

32. The web of impregnated fibrous material according to claim 3, wherein said thermoplastic polymer further comprises carbonaceous fillers.

33. The web of impregnated fibrous material according to claim 3, wherein said thermoplastic polymer further comprises liquid crystal polymers, cyclic poly(butylene terephthalate), or mixtures containing said liquid crystal polymers or said cyclic poly(butylene terephthalate) as additives.

34. The web of impregnated fibrous material of claim 3, wherein the web has a cross-sectional surface dimension represented by an average width and an average thickness, respectively, selected from: 300 mm×2 mm; 200 mm×2 mm; 150 mm×2 mm; 100 mm×2 mm; 596.9×1 mm; 393.7 mm×1 mm; 292 mm×1 mm; 200 mm×1 mm; 150 mm×1 mm; 100 mm×1 mm; 15 mm×0.25 mm; 15 mm×0.225 mm; 14 mm×0.265 mm; 14 mm×0.240 mm; 12.7 mm×0.265 mm; 12.7 mm×0.189 mm; 596.9 mm×0.12 mm; 393.7 mm×0.12 mm; or 292.1 mm×0.12 mm.

35. A three-dimensional composite part comprising at least one web of impregnated fibrous material as defined in claim 3.

36. A process for manufacturing three-dimensional composite parts containing the web of impregnated fibrous material according to claim 1, the process comprising automatically placing the web of impregnated fibrous material on a composite by means of a robot.

37. The process according to claim 36, wherein the three-dimensional composite parts are parts used in the fields of: transportation; renewable energies; thermal protection panels; sports and recreations; health and medicals; and electronics.

38. A method for the preparation of a web of impregnated fibrous material as defined in claim 3, wherein the method comprises a step of stacking and/or joining said N individual tapes of fibrous material.

39. The method of claim 38, wherein the stacking and/or joining step is carried out by at least one of the following steps:
 1) Heating said tapes by at least one heating system and then passing said tapes over at least one supporter provided with another heating system and then passing the tapes over a heating calender;
 2) Passing said tapes over at least one supporter provided with a heating system and then passing the tapes over a heating calender;
 3) Heating said tapes by at least one heating system and then passing the tapes over a heating calender; and
 4) Heating said tapes by at least one heating system and then passing the tapes through a hot drawing plate and passing the tapes over a heating calender.

40. The method of claim 38, wherein the method further comprises a prior step of heating a fibrous material pre-impregnated with the at least one thermoplastic polymer and the optional chain extender, and finalizing the impregnation to obtain an impregnated fibrous material consisting of a tape in the form of a strip having an average thickness of less than or equal to 100 μm, and
 optionally a step of shaping and calibrating a roving or parallel rovings of said impregnated fibrous material to obtain an impregnated fibrous material consisting of a tape in the form of a thin tape having an average thickness of less than or equal to 100 μm.

41. The method of claim 38, wherein the method further comprises a prior step of pre-impregnating a fibrous material.

42. The method of claim 38, wherein the method further comprises a step of shaping the web by means of at least one notched calender.

43. The method according to claim 38, wherein the method further comprises the following steps:
 i) pre-impregnating a fibrous material in order to obtain a pre-impregnated fibrous materials;
 ii) a step of heating said pre-impregnated fibrous material and finalizing the impregnation to obtain an impregnated fibrous material consisting of a tape in the form of a strip having an average thickness of less than or equal to 100 μm;
 iii) optionally a step of shaping and calibrating a roving or parallel rovings of said impregnated fibrous material to obtain an impregnated fibrous material consisting of a tape in the form of a thin tape having an average thickness of less than or equal to 100 μm;
 iv) stacking and/or joining N tapes of fibrous material in the form of a strip or thin tape, said N tapes being capable of overlapping at least partially; and
 v) shaping the web by means of at least one notched calender.

44. The method according to claim 38, wherein the method is carried out at a speed of at least 10 m/min.

* * * * *